(12) United States Patent
Henderson et al.

(10) Patent No.: US 10,787,207 B2
(45) Date of Patent: *Sep. 29, 2020

(54) AERODYNAMIC FAIRINGS FOR CARGO ENCLOSURES

(71) Applicant: Transtex LLC, Lebanon, IN (US)

(72) Inventors: Michael Lorenzo Henderson, Piedmont, SC (US); Stephen Alfred Wulff, Simpsonville, SC (US)

(73) Assignee: TRANSTEX LLC, Lebanon, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/102,172

(22) Filed: Aug. 13, 2018

(65) Prior Publication Data

US 2019/0061841 A1 Feb. 28, 2019

Related U.S. Application Data

(63) Continuation of application No. 15/473,750, filed on Mar. 30, 2017, now Pat. No. 10,059,385, which is a
(Continued)

(51) Int. Cl.
*B62D 35/00* (2006.01)

(52) U.S. Cl.
CPC ......... *B62D 35/008* (2013.01); *B62D 35/001* (2013.01)

(58) Field of Classification Search
CPC .. B62D 35/001; B62D 35/002; B62D 35/005; B62D 35/007; B62D 35/008; B60Q 1/26; B60Q 2/2607; B60Q 1/2611
(Continued)

(56) References Cited

U.S. PATENT DOCUMENTS 3,934,922 A 1/1976 MacCready, Jr. et al.
3,999,797 A 12/1976 Kirsch et al.
(Continued)

FOREIGN PATENT DOCUMENTS

EP 0044746 7/1981
GB 2074107 10/1981
(Continued)

OTHER PUBLICATIONS

PCT—International Search Report and Written Opinion PCT/US2016/051235, dated Dec. 14, 2016 (13 pages).

*Primary Examiner* — Dennis H Pedder
(74) *Attorney, Agent, or Firm* — Tillman Wright, PLLC; Chad D Tillman

(57) ABSTRACT

A nose fairing for a cargo enclosure may generally include a nose body configured to extend outwardly from a front wall of the enclosure. The nose body may include an upper nose wall, a lower nose wall and a leading edge region extending between the upper and lower nose walls. The upper nose wall may include a concave region that terminates at the leading edge region such that the nose fairing transitions directly from the concave region of the upper nose wall to the leading edge region. The lower nose wall may include a convex region that terminates at the leading edge region such that the nose fairing transitions directly from the convex region of the lower nose wall to the leading edge region. The leading edge region may define a radius of curvature that differs from a radius of curvature of the convex region of the lower nose wall.

20 Claims, 14 Drawing Sheets

Related U.S. Application Data continuation of application No. 14/868,530, filed on Sep. 29, 2015, now Pat. No. 9,616,945.

(58) Field of Classification Search
USPC .......................................... 296/180.1, 180.4
See application file for complete search history.

(56) References Cited

U.S. PATENT DOCUMENTS

| | | | |
|---|---|---|---|
| 4,021,069 A | 5/1977 | Hersh | |
| 4,057,280 A * | 11/1977 | MacCready, Jr. .... | B62D 35/001 |
| | | | 296/180.4 |
| 4,135,754 A | 1/1979 | FitzGerald et al. | |
| 4,281,869 A * | 8/1981 | Saint ................... | B62D 35/001 |
| | | | 296/180.4 |
| D266,158 S | 9/1982 | Sullivan | |
| 4,360,232 A | 11/1982 | Elder | |
| 4,457,550 A | 7/1984 | Gielow | |
| 4,553,782 A | 11/1985 | Markland | |
| 4,702,509 A | 10/1987 | Elliott, Sr. | |
| 4,703,970 A * | 11/1987 | Gorka ................. | B62D 35/001 |
| | | | 296/180.2 |
| 5,280,990 A | 1/1994 | Rinard | |
| 5,403,059 A | 4/1995 | Turner | |
| 7,008,005 B1 | 3/2006 | Graham | |
| 7,784,409 B2 | 8/2010 | Iden et al. | |
| 7,841,280 B2 | 11/2010 | Iden et al. | |
| 8,113,570 B1 | 2/2012 | Smith | |
| 8,511,236 B2 | 8/2013 | Iden | |
| 8,534,746 B1 | 9/2013 | Smith | |
| 2005/0281042 A1 * | 12/2005 | Kawai ..................... | B60Q 1/32 |
| | | | 362/493 |
| 2006/0232102 A1 | 10/2006 | Steel | |
| 2008/0116715 A1 | 5/2008 | Steel | |

FOREIGN PATENT DOCUMENTS

| | | |
|---|---|---|
| GB | 2186532 | 8/1987 |
| JP | S5663681 | 5/1981 |
| JP | H02290788 | 11/1990 |

* cited by examiner

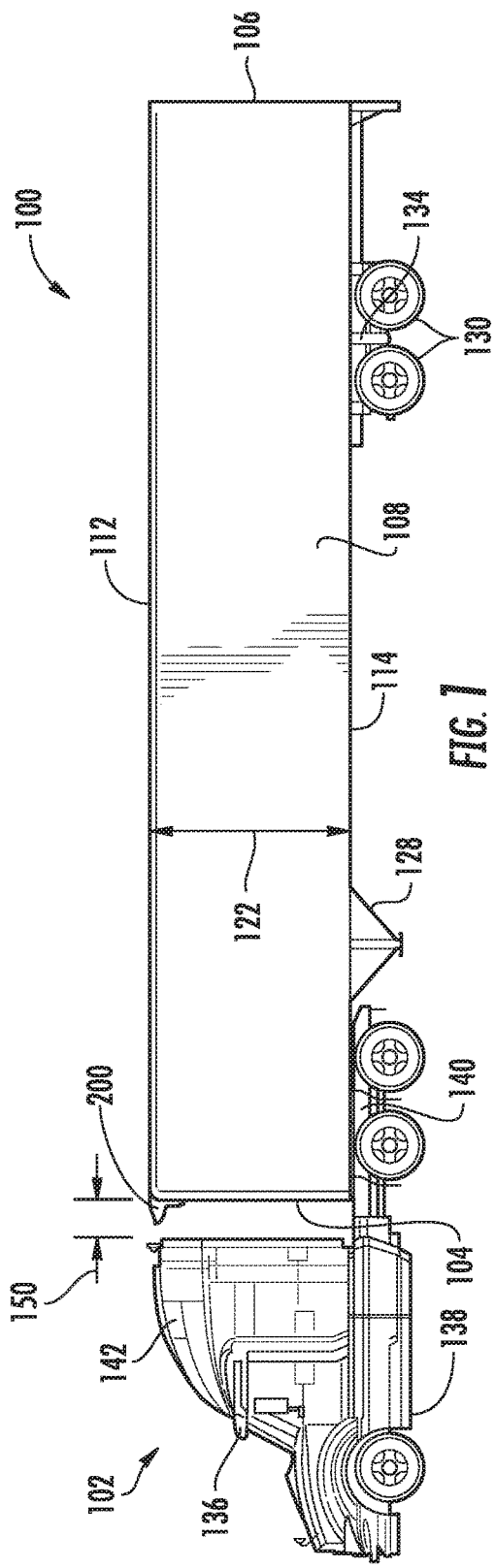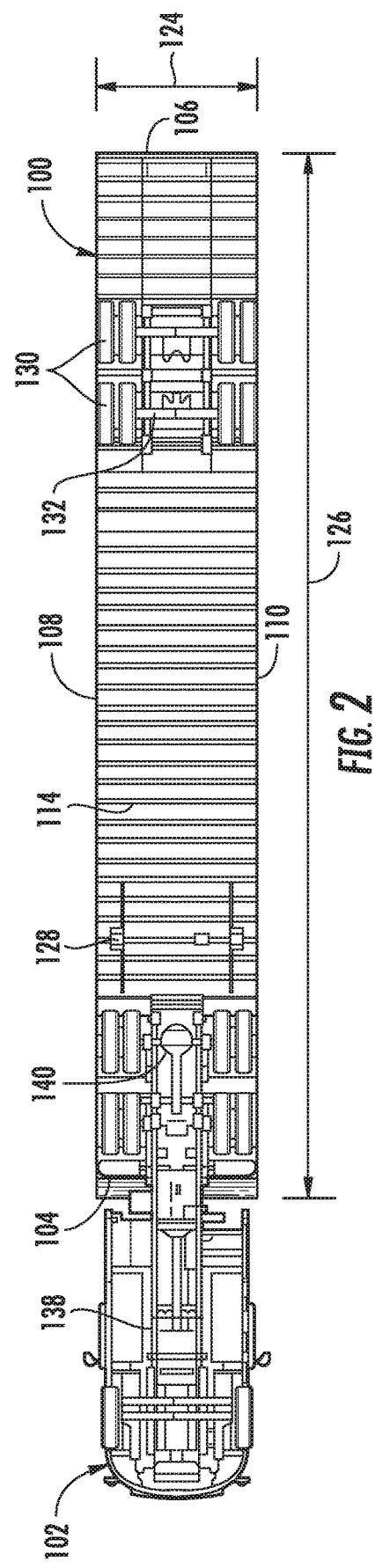

AERODYNAMIC FAIRINGS FOR CARGO ENCLOSURES

CROSS-REFERENCE TO RELATED APPLICATIONS

This application is a continuation of and claims the benefit of priority of U.S. patent application Ser. No. 15/473,750, filed on Mar. 30, 2017, now U.S. Pat. No. 10,059,385, which, in turn, is a continuation of and claims the benefit of priority of U.S. patent application Ser. No. 14/868,530, filed on Sep. 29, 2015, now U.S. Pat. No. 9,616,945, the disclosures of all of which are hereby incorporated by reference herein in their entirety for all purposes.

FIELD OF THE INVENTION

The present subject matter relates generally to aerodynamic fairings for cargo enclosures and, more particularly, to a nose fairing and side fairings configured to be installed along the top and side edges, respectively, of the front wall of a cargo enclosure.

BACKGROUND OF THE INVENTION

An ongoing effort to reduce drag in vehicular structures and associated cargo enclosures is of great importance as fuel economy becomes an increasingly large consideration in the overall design of a vehicle and/or its associated cargo enclosure. As the drag increases, the amount of fuel needed to move the vehicle also increases due to the greater energy required to overcome the drag. For instance, it has been stated that for a vehicle traveling at 70 mph, about 65% of the total fuel consumption of the vehicle's engine is used to overcome drag. Therefore, even a small reduction in the drag experienced by a vehicle traveling at highway speeds can result in a significant improvement in fuel economy.

For instance, heavy-duty vehicles such as tractor-trailers (also known as semi tractors, tractors, class 8 long haul trucks, transfer trucks, 18-wheelers, semis, etc.) have a tall and wide box-shaped profile that creates a significant amount of drag compared to smaller vehicles on the road. For instance. Table I lists common drag coefficients of road vehicles.

TABLE I

| Type of Vehicle | Drag Coefficient (Cd) |
| --- | --- |
| Low Drag Production Car | .26 |
| Typical Sedan | .3-.35 |
| Sport Utility Vehicle | .4-.5 |
| Pick-up Truck | .4-.5 |
| Conventional Class 8 long haul tractor trailers | .59-.63 |

Additionally, conventional cargo enclosures often have a similarly tall and wide box-shaped profile that creates a significant amount of drag. For example, trailers typically define an enclosed cargo space that is rectangular in shape. For example, the most common type of cargo trailer in the U.S. is a dry box van that is 53 feet long.

Various devices have been developed in the past to address certain areas of drag on a vehicle and/or its associated cargo enclosure, such on a tractor-trailer combination. However, these devices often have significant limitations in their ability to reduce drag and/or their ability to be easily integrated into fleet operations. As a result, a comprehensive solution for reducing vehicle drag is still needed.

Thus, a need exists for an improved aerodynamic fairing(s) that is designed to provide drag reduction for a cargo enclosure that is included within or configured to be coupled to or hauled by a vehicle. Retrofit kits for incorporating such devices onto a cargo enclosure would also be beneficial. Moreover, methods relating to the utilization of such devices would also be beneficial.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a cargo enclosure for storing cargo. The cargo enclosure may include a front wall, a rear wall and a roof extending between the front and rear walls. The cargo enclosure may also define a top edge at the interface between the front wall and the roof. In addition, the cargo enclosure may include a nose fairing extending outwardly from the front wall. The nose fairing may include an upper nose wall, a lower nose wall and a leading edge region extending between the upper and lower nose walls. The upper nose wall may extend away from the front wall at a location at or adjacent to the top edge of the cargo enclosure. Moreover, the upper nose wall may include a concave region defining a concavely curved surface, wherein the concave region terminates at the leading edge region such that the nose fairing transitions directly from the concave region of the upper nose wall to the leading edge region as the nose fairing extends outwardly from the front wall. Further, the lower nose wall may include a convex region defining a convexly curved surface, wherein the convex region terminates at the leading edge region such that the nose fairing transitions directly from the convex region of the lower nose wall to the leading edge region as the nose fairing extends outwardly from the front wall. Additionally, the leading edge region may define a radius of curvature that differs from a radius of curvature of the convex region of the lower nose wall.

In another aspect, the present subject matter is directed to a kit for retrofitting an existing cargo enclosure, wherein the cargo enclosure includes a front wall, a rear wall and a roof extending between the front and rear walls and defines a top edge at the interface between the front wall and the roof. The kit may generally include a nose fairing configured to extend outwardly from the front wall at a location at or adjacent to the top edge of the cargo enclosure. The nose fairing may include an upper nose wall, a lower nose wall and a leading edge region extending between the upper and lower nose wall. The upper nose wall may include a concave region defining a concavely curved surface, wherein the concave region terminates at the leading edge region such that the nose fairing transitions directly from the concave region of the upper nose wall to the leading edge region. In addition, the lower nose wall may include a convex region defining a convexly curved surface, wherein the convex region terminates at the leading edge region such that the nose fairing transitions directly from the convex region of the lower nose wall to the leading edge region. Moreover, the leading edge region may define a radius of curvature that differs from a radius of curvature of the convex region of the lower nose wall.

In a further aspect, the present subject matter is directed to a nose fairing for a cargo enclosure. The nose fairing may generally include a nose body configured to extend outwardly from a front wall of the cargo enclosure. The nose body may include an upper nose wall, a lower nose wall and a leading edge region extending between the upper and lower nose walls. The upper nose wall may include a concave region defining a concavely curved surface, wherein the concave region terminates at the leading edge region such that the nose fairing transitions directly from the concave region of the upper nose wall to the leading edge region. In addition, the lower nose wall may include a convex region defining a convexly curved surface, wherein the convex region terminates at the leading edge region such that the nose fairing transitions directly from the convex region of the lower nose wall to the leading edge region. Moreover, the leading edge region may define a radius of curvature that differs from a radius of curvature of the convex region of the lower nose wall.

In yet another aspect, the present subject matter is directed to a method for retrofitting a cargo enclosure including a front wall, a rear wall and a roof extending between the front and rear walls, wherein the cargo enclosure defines a top edge at the interface between the front wall and the roof. The method may include installing a nose fairing at or adjacent to the top edge of the enclosure such that the nose fairing extends outwardly from the front wall. The nose fairing may include an upper nose wall, a lower nose wall and a leading edge region extending between the upper and lower nose walls. The upper nose wall may include a concave region defining a concavely curved surface, wherein the concave region terminates at the leading edge region such that the nose fairing transitions directly from the concave region of the upper nose wall to the leading edge region as the nose fairing extends outwardly from the front wall. In addition, the lower nose wall may include a convex region defining a convexly curved surface, wherein the convex region terminates at the leading edge region such that the nose fairing transitions directly from the convex region of the lower nose wall to the leading edge region as the nose fairing extends outwardly from the front wall. Moreover, the leading edge region may define a radius of curvature that differs from a radius of curvature of the convex region of the lower nose wall.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of one embodiment of a cargo enclosure configuring in accordance with aspects of the present subject matter, particularly illustrating the cargo enclosure being coupled to a tractor and including a nose fairing installed at the top edge of the front wall of the enclosure;

FIG. 2 illustrates a bottom view of the cargo enclosure and tractor shown in FIG. 1;

DETAILED DESCRIPTION OF THE INVENTION

Figure 3:
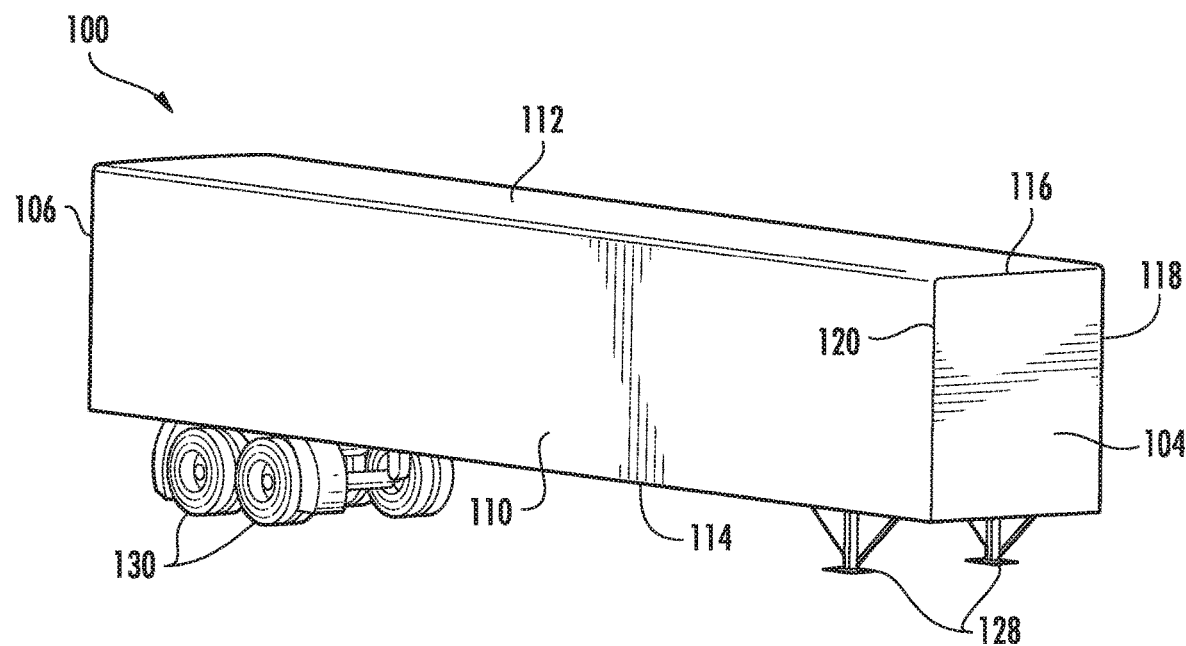
FIG. 3 illustrates a front, perspective view of the cargo enclosure shown in FIGS. 1 and 2 with the nose fairing removed from the front wall of the enclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to aerodynamic fairings positioned or configured to be installed at the front end of a cargo enclosure to reduce the amount of drag on the enclosure as it is being hauled or transported. Specifically, in several embodiments, a nose fairing may be positioned or installed along the front wall of the cargo enclosure at or adjacent to its top edge. The nose fairing may generally define an aerodynamic shape or profile that is configured to speed up the airflow flowing across the fairing, thereby creating one or more low pressure zones in front the nose fairing that serve to reduce the amount of drag on the cargo enclosure. In addition, the low pressure zone(s) may create a lift vector in the travel direction of the cargo enclosure that generates a net thrusting force for the enclosure.

Moreover, in several embodiments, one or more side fairings may be positioned or installed on the front wall of the cargo enclosure along its side edges. The side fairings may be positioned or installed as stand-alone components or may be positioned or installed in combination with the nose fairing. Similar to the nose fairing, each side fairing defines an aerodynamic shape or profile that is configured to speed up the airflow flowing across the fairing, thereby creating one or more low pressure zones in front the side fairing that serve to reduce the amount of drag on the cargo enclosure and/or that generate a net thrusting force for the enclosure.

It should be appreciated that, although the disclosed fairings will generally be described herein as corresponding to separate components configured to be separately installed onto a cargo enclosure, the fairings may, instead, be formed integrally with the cargo enclosure. For instance, the design of the cargo enclosure, itself, may be modified or otherwise configured to incorporate the various features of the fairings described herein. In such an embodiment, the cargo enclosure may be initially manufactured to include one or more of the disclosed fairings. For example, the front wall and/or the roof of the cargo enclosure may be modified to incorporate the design features of one or more embodiments of the nose fairings described herein. Similarly, the front wall and/or the sidewall(s) of the cargo enclosure may be modified to incorporate the design features of one or more embodiments of the side fairings described herein.

Referring now to FIGS. 1-3, several views of one embodiment of a cargo enclosure 100 onto which one or more of the disclosed fairings may be installed is illustrated in accordance with aspects of the present subject matter. Specifically, FIGS. 1 and 2 illustrate side and bottom views, respectively, of the cargo enclosure 100 coupled to a tractor 102 in accordance with aspects of the present subject matter. Additionally, FIG. 3 illustrates a perspective view of the cargo enclosure 100 shown in FIGS. 1 and 2.

In several embodiments, the cargo enclosure 100 may generally define an enclosed space or volume for storing cargo. For example, as shown in FIGS. 1-3, the cargo enclosure 100 may, in one embodiment, define a rectangular storage space bounded along its sides by a front wall 104, a rear wall 106 and opposed sidewalls (e.g., a first sidewall 108 and a second sidewall 110) extending between the front and rear walls 104, 106. In addition, the cargo enclosure 100 may include a roof 112 forming the top of the enclosed space and a floor 114 forming the bottom of the enclosed space. It should be appreciated that, in other embodiments, the various walls 104, 106, 108, 110, roof 112 and/or floor 114 of the cargo enclosure 100 may be configured in any other manner such that the enclosure 100 defines a storage space having any other suitable shape.

As particularly shown in FIG. 3, the cargo enclosure 100 may define various corners or edges at the intersection between the front wall 104 and the various other walls/surfaces of the enclosure 100. For example, the cargo enclosure 100 may include a top edge 116 defined at the intersection between the front wall 104 and the roof 112 of the enclosure 100. Additionally, as shown in FIG. 3, the cargo enclosure may include a first side edge 118 defined at the intersection between the front wall 104 and the first sidewall 108 of the enclosure 100 and a second side edge 120 defined at the intersection between the front wall 104 and the second sidewall 110 of the enclosure 100.

Additionally, the cargo enclosure 100 may generally define any suitable dimensions. For example, as shown in FIG. 1, the cargo enclosure 100 may define a height 122 extending between the roof 112 and the floor 114 of the enclosure 100. In addition, as shown in FIG. 2, the cargo enclosure 100 may define a width 124 extending between its opposed sidewalls 108, 110 and a length 126 extending between the front wall 104 and the rear wall 106 of the enclosure 100.

Moreover, as shown in FIGS. 1-3, the cargo enclosure 100 may, in several embodiments, form part of a trailer configured for use as a tractor-trailer combination. In such embodiments, the cargo enclosure 100 may include or be associated with any suitable trailer-related components, such as landing gear 128, wheels 130, axles 132, a suspension system 134 and/or the like. Additionally, when used in a tractor-trailer combination, the cargo enclosure 100 may be configured to be coupled to or hauled by a tractor 102 having any suitable tractor configuration. For example, as shown in the illustrated embodiment, the tractor 102 may include a cab 136 supported on a chassis 138 and a fifth wheel coupling 140 extending behind the cab 136 for coupling the tractor 102 to the cargo enclosure 100. Additionally, as particularly shown in FIG. 1, the tractor 102 may include an air dam 142 mounted on top of the cab 136.

It should be appreciated that, in other embodiments, the cargo enclosure 100 may correspond to or form part of any other suitable transport vehicle and/or transport/storage system. For example, the cargo enclosure 100 may correspond to or form part of the rear storage enclosure of a straight or box truck. In another embodiment, the cargo enclosure 100 may correspond to or form part of a railway car or boxcar, a motorhome, bus, cab-over-type vehicle and/or any other suitable movable storage compartment or space, regardless of whether the compartment/space is pulled, pushed or self-propelled.

In accordance with aspects of the present subject matter, one or more fairings may be installed at or adjacent to the front wall 104 of the cargo enclosure 100 to reduce the amount of drag acting on the enclosure 100 as it is being transported. For example, as shown in FIG. 1, one or more nose fairings 200 may be installed at or adjacent to top edge 116 of the cargo enclosure 100 defined at the interface between the front wall 104 and the roof 112. In addition, one or more side fairings (not shown in FIG. 1) may be installed at or adjacent to one or both of the side edges 118, 120 defined at the interface between the front wall 104 and the sidewalls 108, 110 of the enclosure 100. As will be described below, a shape or profile of the fairing(s) may be configured to eliminate the high pressure region formed along the edges 116, 118, 120 of the front wall 108 of the cargo enclosure 100 as the enclosure 100 is being transported (e.g., along a highway), thereby reducing the overall drag on the cargo enclosure. In addition, the shape or profile of the fairing(s) may also be configured to generate thrust in the direction of travel of the cargo enclosure.

Figure 4:
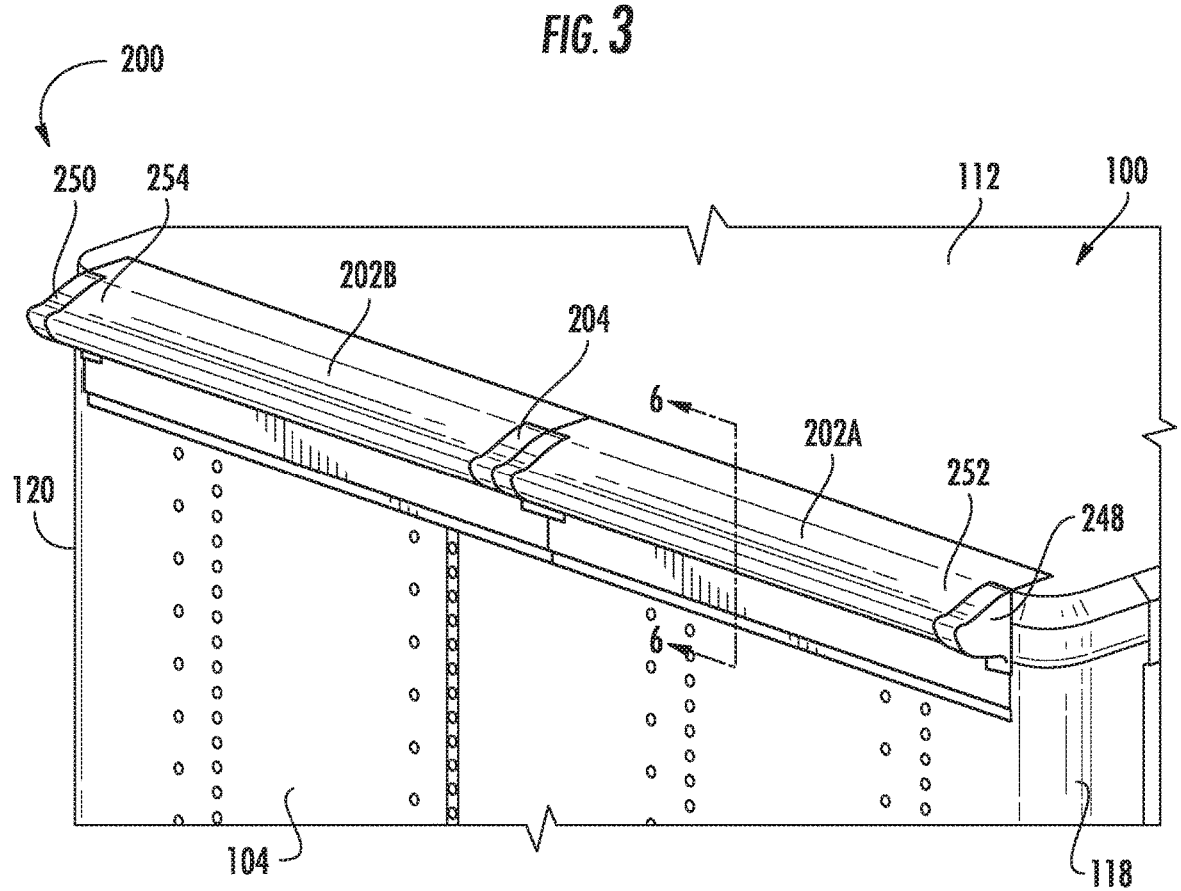
FIG. 4 illustrates a perspective view of one embodiment of a nose fairing configured in accordance with aspects of the present subject matter, particularly illustrating the nose fairing installed at or adjacent to the top edge of the front wall of the cargo enclosure shown in FIGS. 1-3.
Figure 5:
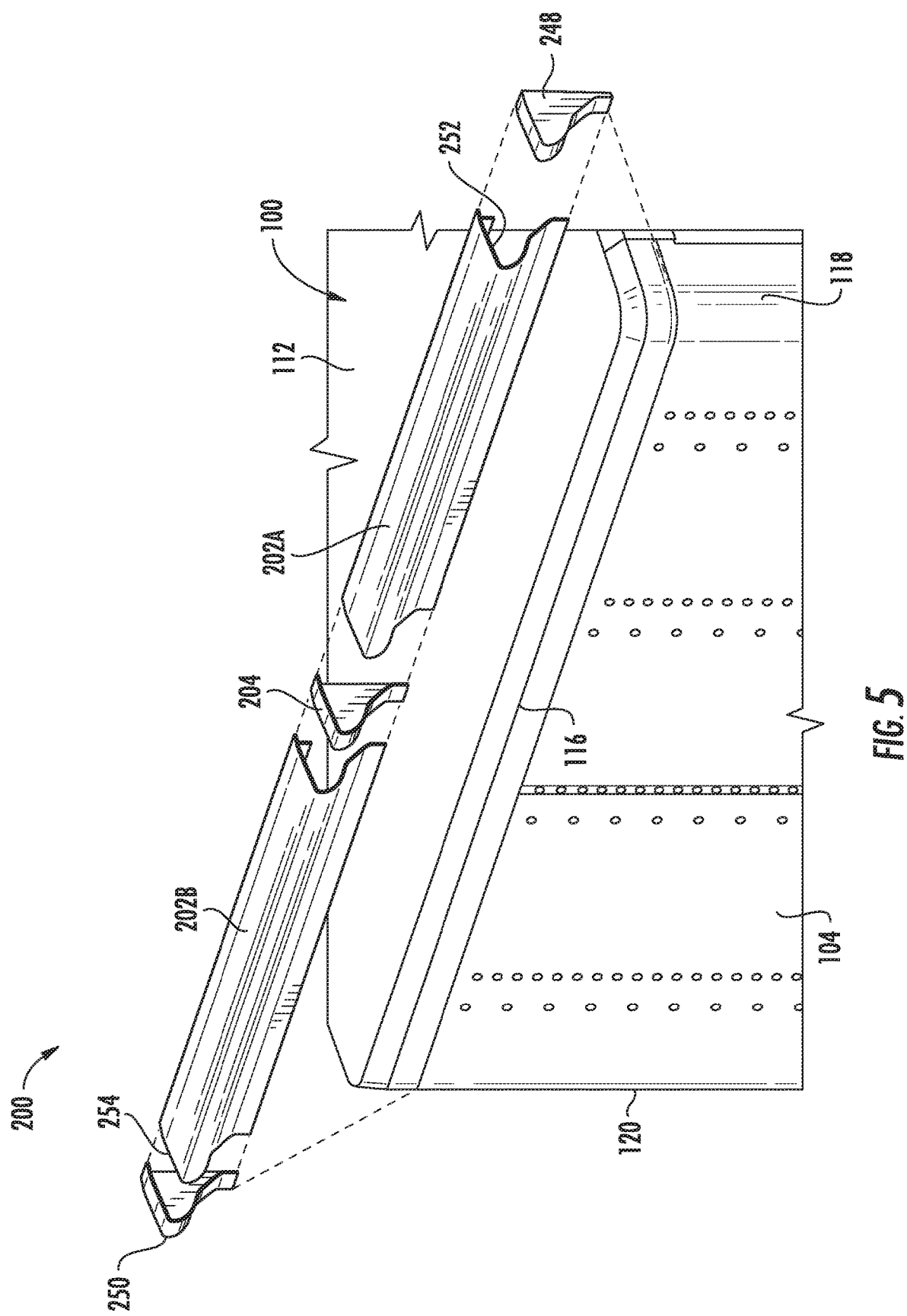
FIG. 5 illustrates an exploded, perspective view of the nose fairing shown in FIG. 4.
Figure 6:
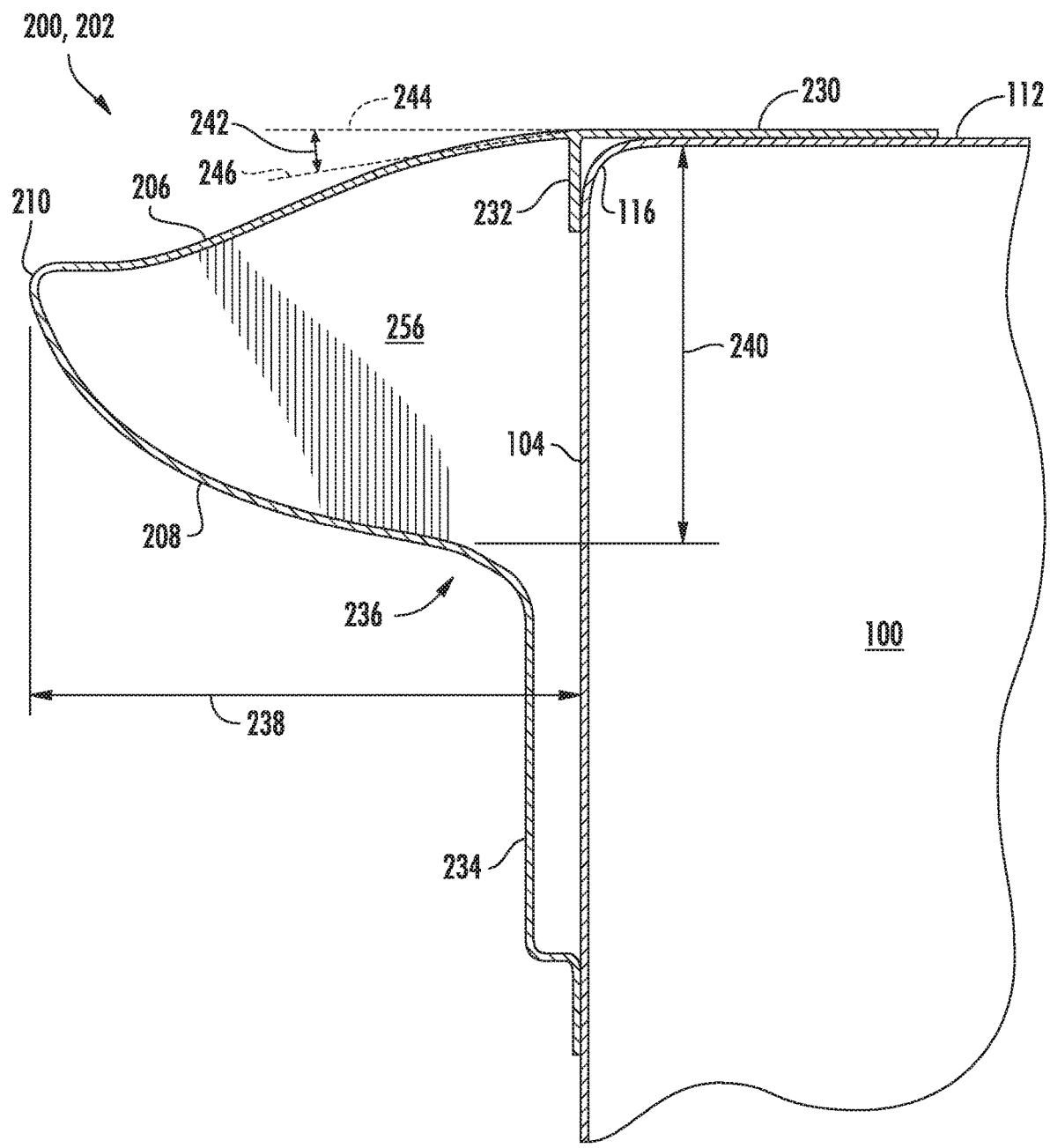
FIG. 6 illustrates a cross-sectional view of the nose fairing shown in FIG. 4 taken about line 6-6.
Figure 7:
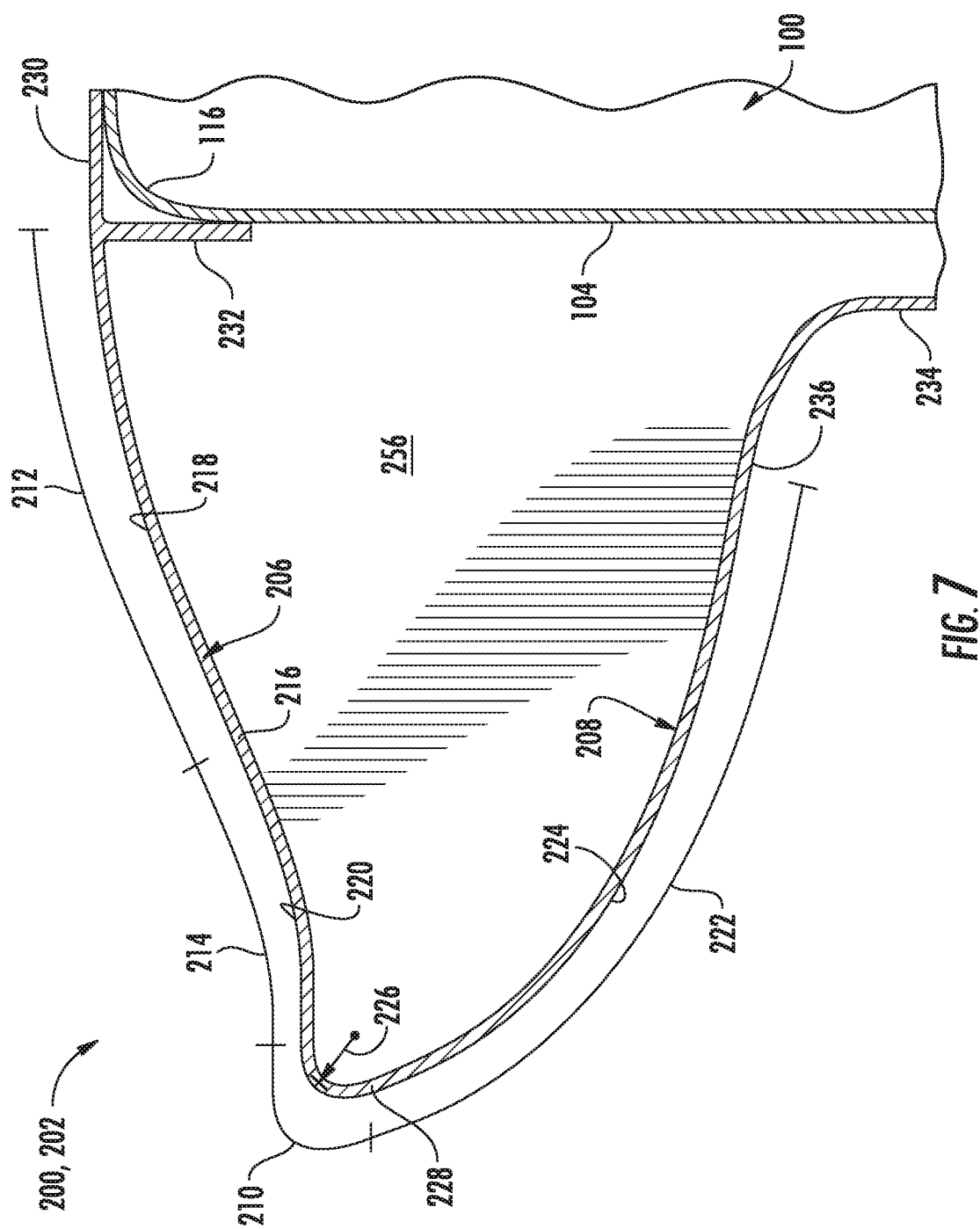
FIG. 7 illustrates a close-up view of a portion of the nose fairing shown in FIG. 6.

Referring now to FIGS. 4-7, one embodiment of a nose fairing 200 configured to be installed at the front end of a cargo enclosure 100 is illustrated in accordance with aspects of the present subject matter. Specifically, FIG. 4 illustrates a perspective view of the nose fairing 200 installed on the front wall 104 of the cargo enclosure at or adjacent to its top edge 116. FIG. 5 illustrates an exploded view of the nose fairing 200 shown in FIG. 4. FIG. 6 illustrates a cross-sectional view of the nose fairing 200 shown in FIG. 4 taken about line 6-6. Additionally, FIG. 7 illustrates a close-up view of a portion of the nose fairing 200 shown in FIG. 6.

In general, the nose fairing 200 may include a unitary or multi-piece nose body 202 configured to be installed along the front wall 104 at or adjacent to the front, top edge 116 of the cargo enclosure 100. For example, as shown in FIGS. 4 and 5, the nose fairing 200 includes a two-piece nose body 202 having a first body portion 202A and a second body portion 202B configured to be coupled together such that the nose body 200 extends lengthwise along the front wall 104 across all or a substantial portion of the width 124 of the cargo enclosure 100. In such an embodiment, the nose fairing 200 may also include a body coupling 204 configured to be installed between the adjacent body portions 202A, 202B so at to couple the body portions 202A, 202B to one another. Alternatively, as will be described below with reference to embodiments shown in FIGS. 9-12, the nose body 200 may correspond to a unitary or continuous component configured to span across all or a substantial portion of the width 124 of the cargo enclosure 100. Similarly, in a further embodiment, the nose body 200 may be formed from three or more body portions, with each pair of adjacent body portions configured to be coupled together via a corresponding body coupling 204.

It should be appreciated that, as an alternative to coupling the adjacent body portions 202A, 202B together using a body coupling 204, the body portions 202A, 202B may, instead, be coupled directly to one another. For instance, in one embodiment, the first body portion 202A may be configured to overlap the second body portion 202B along the width 124 of the cargo enclosure 100 to allow the body portions 202A, 202B to be coupled to one another. In another embodiment, the body portions 202A, 202B may be coupled to one another end-to-end (e.g., to form a butt joint).

In several embodiments, the nose body 202 may define the primary, aerodynamic shape of the nose fairing 200. For example, as shown in FIG. 6, the nose body 202 may include an upper nose wall 206 defining an upper aerodynamic surface of the nose body 202 and a lower nose wall 208 defining a lower aerodynamic surface of the nose body 202. In addition, the nose body 202 may include a leading edge region 210 extending between the upper and lower nose walls 208, 210 that generally defines the leading or forward edge of the nose body 202.

As particularly shown in FIG. 7, the upper nose wall 206 may generally be configured to extend outwardly from the front wall 104 of the cargo enclosure 100 from a location at or adjacent to the top edge 116 of the enclosure 100 to the leading edge region 210 so as to define the upper aerodynamic surface of the nose body 202. For example, in several embodiments, the portion of the upper nose wall 206 extending outwardly from the front wall 104 may include a convex region 212 (also referred to herein as an upper convex region) and a concave region 214, with the upper nose wall 206 transitioning from the convex region 212 to the concave region 214 at a transition point 216 as the upper nose wall 206 extends outwardly from the front wall 104 of the cargo enclosure 100. The convex region 212 may generally define a convexly curved surface 218 of the upper aerodynamic surface while the concave region 214 may generally define a concavely curved surface 220 of the upper aerodynamic surface. Additionally, as shown in FIG. 7, the concave region 214 of the upper nose wall 206 may terminate at the leading edge region 210 such that the upper nose wall 206 transitions directly from the concave region 214 to the leading edge region 210 as the nose body 202 extends outwardly from the front wall 104 of the cargo enclosure 100.

Additionally, as shown in FIG. 7, the lower nose wall 208 may generally be configured to extend between the front wall 104 of the cargo enclosure 100 and the leading edge region 210 of the nose body 202 so as to define the lower aerodynamic surface of the nose body 202. In several embodiments, the lower nose wall 208 may include a convex region 222 extending outwardly from the front wall 104 in the direction of the leading edge region 210. Specifically, the convex region 222 may be configured to terminate at the leading edge region 210 such that the lower nose wall 208 transitions directly from the convex region 222 to the leading edge region 210 as the nose body 202 extends outwardly from the front wall 104. As shown in FIG. 7, the convex region 222 may generally define a convexly curved surface 224 of the lower aerodynamic surface.

Additionally, as shown in FIG. 7, the leading edge region 210 may generally correspond to a forward portion of the nose body 202 defining a radius of curvature 226 that differs from the radius of curvature defined by the upper and/or lower aerodynamic surfaces, such as by defining a radius of curvature 226 that differs from the radius of curvature of the convex region 222 of the lower nose wall 208 and/or from the radius of curvature of the concave region 214 and/or the convex region 212 of the upper nose wall 206. In several embodiments, the leading edge region 210 may define a constant radius of curvature 226 between the convex region 222 of the lower nose wall 208 and the concave region 214 of the upper nose wall 206. In such embodiments, the nose body 202 may transition from the uniformly radiused leading edge region 210 to the aerodynamically shaped upper and lower nose walls 206, 208. For example, in one embodiment, the aerodynamic surface defined by the upper nose wall 206 and/or the lower nose wall 208 may correspond to a complex surface having a radius of curvature that varies as the nose body 202 extends outwardly from the front wall 104 of the cargo enclosure 100 towards the leading edge region 210.

By configuring the shape of the nose body 202 in the manner described herein, an improved aerodynamic profile may be provided to the front nose or top edge 116 of a cargo enclosure 100. Specifically, by configuring the nose body 202 to transition from the convex region 222 of the lower nose wall 208 to the radiused leading edge region 210 and then from the leading edge region 210 to the concave/convex regions 214, 212 of the upper nose wall 206, the disclosed nose fairing 200 may significantly reduce the amount of drag at the front end of the cargo enclosure 100 and may also generate a thrusting force in the travel direction of the enclosure 100. For example, a stagnation point 228 for the airflow flowing towards the cargo enclosure 110 may be defined at or adjacent to the transition point between the leading edge region 210 and the lower nose wall 208. By providing the radiused leading edge region 210 and the convexly curved region 222 of the lower nose wall 208 along either side of the stagnation point 228, the regions 210, 222 may generate suction by speeding up the airflow as it flows outwardly from the stagnation point 228, thereby creating low pressure zones adjacent to such regions 210, 222. Additionally, the concave region 214 of the upper nose wall 206 may provide a transition surface between the low pressure zone formed at the leading edge region 210 and a corresponding low pressure second formed along the convex region 212 of the upper nose wall 206 as the velocity of the airflow is increased as it flows across such convexly curved surface 218. As a result, the nose body 202 may eliminate the high pressure zone(s) typically formed at the top edge 116 of a conventional cargo enclosure. Moreover, the resulting low pressure zones may generate a lift vector in the travel direction of the cargo enclosure 100 that provides a net thrusting force for the enclosure 100. Such a reduction in drag, along with the generation of thrust, may, in turn, translate into improved fuel economy, reduced emissions of carbon dioxide, as well as other improved efficiencies, for the vehicle being used to transport the corresponding enclosure 100.

Additionally, as shown in FIG. 6, in one embodiment, the upper nose wall 206 may also include an overlapped region 230 extending aft of the nose or top edge 116 of the cargo enclosure 100 such that the overlapped region 230 overlaps at least a portion of the roof 112 of the enclosure 100. As shown in the illustrated embodiment, the overlapped region 206 generally defines a planar surface extending directly adjacent to the roof 112. However, in other embodiments, the overlapped region 230 may be curved and/or may be spaced apart from the roof 112. For instance, as will be described below with reference to FIG. 12, the overlapped region 230 may, in one embodiment, form an extension of the convex region 212 of the upper nose wall 206 and may define a convexly shaped surface that is spaced apart from the roof 112 along at least a portion of the overlapped region 230.

It should be appreciated that, in several embodiments, the overlapped region 230 of the upper nose wall 206 may be configured to provide a means for coupling the nose body 202 to the cargo enclosure 100. For instance, the overlapped region 230 may define a plurality of openings (not shown) configured to receive mechanical fasteners for coupling the nose body 202 to the cargo enclosure 100. Alternatively, the overlapped region 230 may be secured directly to the roof 112 of the cargo enclosure 100, such as by bonding the overlapped region 230 to the roof 112 or by welding the overlapped region 230 to the roof 112.

Moreover, in several embodiments, the disclosed nose fairing 200 may also include additional features for locating the nose body 202 relative to the cargo enclosure 100 and/or for coupling the nose body 202 to the cargo enclosure 100. For example, as shown in FIGS. 6 and 7, the nose fairing 200 may include a nose lip 232 configured to extend outwardly from the upper nose wall 206 along the front wall 104 of the cargo enclosure 100. Such lip 232 may generally serve as a mechanical stop for installing the nose fairing 202 onto the cargo enclosure 100. For instance, the nose fairing 202 may be moved towards the cargo enclosure 100 until the nose lip 232 contacts the front wall 104, thereby indicating that the nose fairing 202 is properly positioned relative to the cargo enclosure 100.

Additionally, as shown in FIG. 6, the lower nose wall 208 may, in several embodiments, include a lower mounting region 234 extending along the front wall 104 of the cargo enclosure 100 in a direction away from the roof 112 so as to provide a means for coupling the nose fairing 202 to the front wall 104. Specifically, as shown in the illustrated embodiment, the lower nose wall 208 may transition from its convex region 222 to the lower mounting region 234 at a transition location 236 defined adjacent to the front wall 104. The lower nose wall 208 may then extend downwardly adjacent to the front wall 104 along the lower mounting region 234. As should be readily appreciated, the lower mounting region 234 may be coupled to the front wall 104 at one or more locations using mechanical fasteners, adhesives and/or any other suitable coupling means.

Moreover, it should be appreciated that that the overall shape and/or size of the nose body 202 may be varied, as necessary, to accommodate differing airflow characteristics experienced by the nose fairing 200 and/or differing parameters that may impact the airflow flowing across and/or adjacent to the nose fairing 200, such as differing sizes of air gaps defined between the nose fairing 200 and the adjacent vehicle and/or component located directly upstream of the nose fairing 202. For instance, as shown in FIG. 1, an air gap 150 may be defined between the nose fairing 202 and the rear end of the cab 136 or air dam 142 of the tractor 102. As the size of such gap 150 increases or decreases, the shape and/or size of the nose body 202 may be adjusted to accommodate for changes in the characteristics of the airflow impinging against the nose or front end of the cargo enclosure 100. For instance, in one embodiment, a crosswise dimension 236 of the nose fairing 202 defined between the front wall 104 of the cargo enclosure 100 and the leading edge region 210 and/or a heightwise dimension 240 of the nose fairing 202 defined between the roof 112 and the lower end of the convex region 222 of the lower nose wall 208 (e.g., at the transition location 236) may be varied to account for differing sized air gaps 150 and/or differing airflow characteristics experienced by the nose fairing 200.

It should also be appreciated that the curvature of the convex region 212 of the upper nose wall 206 may also be varied, as necessary, to adjust an inflow angle 242 defined by the nose body 202 to accommodate differing incoming flow angles for the airflow. In general, the inflow angle 242 may be defined between a reference line 244 extending parallel to the plane defined by the roof 112 of the cargo enclosure 100 and a reference line 246 extending through at least a portion of the convex region 222 of the upper nose wall 206. In several embodiments, the inflow angle 242 may generally range from zero degrees to about 45 degrees, such as from about 10 degrees to about 35 degrees or from about 15 degrees to about 30 degrees and/or any other subranges therebetween.

Referring still to FIGS. 4-7, in several embodiments, the nose fairing 200 may also include an end cap 248, 250 positioned at each end of the nose body 200. For example, as shown in FIGS. 4 and 5, first and second end caps 248, 250 are positioned at the opposed ends 252, 254 of the nose body 202, such as by installing the first end cap 248 at an outer end 252 of the first body portion 202A and the second end cap 250 at an outer end 254 of the second body portion 202B. In general, each end cap 248, 250 may be configured to close off or cap the ends of the inner cavity 265 (FIGS. 6 and 7) defined between the nose body 202 and the front wall 104 of the cargo enclosure 100. As such, all or a portion of each end cap 248, 250 may be configured to define a shape or profile that matches or conforms to the aerodynamic shape or profile of the nose body 202, thereby allowing the end cap 248, 250 to mate with or otherwise be coupled to one of the ends 252, 254 of the nose body 202.

Figure 8:
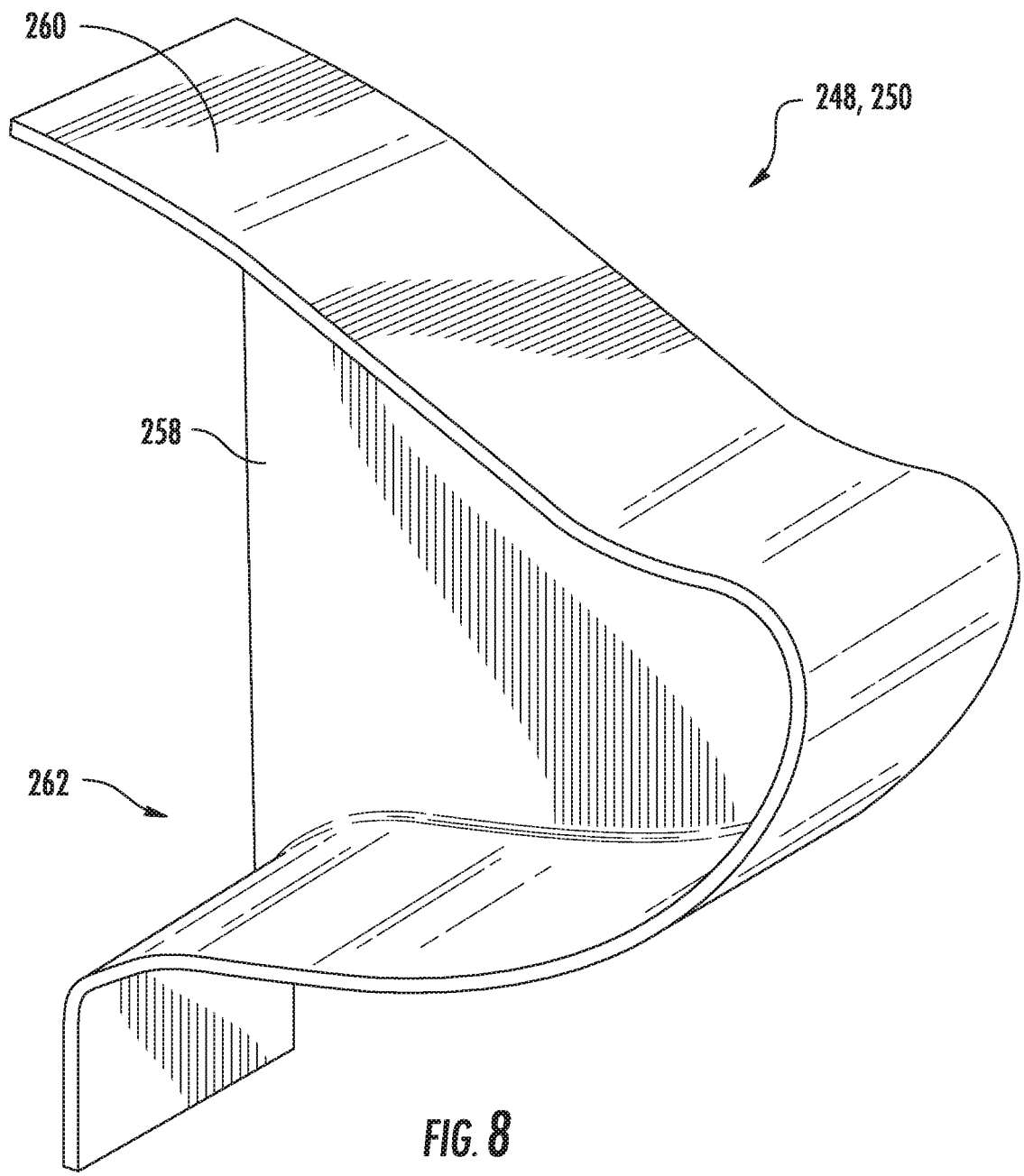
FIG. 8 illustrates a perspective view of one embodiment of an end cap suitable for use with the nose fairing shown in FIGS. 4-7 in accordance with aspects of the present subject matter.

For example, a perspective view of one embodiment of an end cap 248, 250 configured in accordance with aspects of the present subject matter is illustrated in FIG. 8. As shown, the end cap 248, 250 includes an endwall 258 and a sidewall 260 extending outwardly from the endwall 258, with the sidewall 260 generally defining a shape or profile corresponding to the aerodynamic shape or profile of the nose body 202. In one embodiment, the configuration of the sidewall 260 may be oversized such that the corresponding end 252, 254 of the nose body 202 may be received within the end cap 248, 250 (e.g., with an inner cavity 262 defined between opposed sides of the sidewall 260). In such an embodiment, the sidewall 260 of the end cap 248, 250 may be configured to overlap a portion of the outer surface of the nose body 202 when the cap 248, 250 is installed onto the body 202. In an alternative embodiment, the configuration of the sidewall 260 may be undersized such that the end 252, 254 of the nose body 202 may be configured to receive the sidewall 260 (e.g., within the interior cavity 256 defined between the nose body 202 and the cargo enclosure 100). In such an embodiment, a portion of the nose body 202 may be configured to overlap an outer surface of the sidewall 260 of the end cap 248, 250 when the cap 248, 250 is installed onto the body 202. In a further embodiment, the sidewall 260 may be configured to form a tongue and groove-type joint with the adjacent end of the nose body 202.

It should be appreciated that, in an alternative embodiment, the nose body 202 may include integrally formed endwalls at each of its outer ends 252, 254. In such an embodiment, the nose fairing 202 need not include the separate end caps 248, 250.

It should also be appreciated that, in one embodiment, the body coupling 204 described above may be configured similarly to the end cap 248, 250 shown in FIG. 8. For example, as opposed to including a single sidewall 260 extending from one side of the endwall 258, the body coupling 204 may include sidewalls 260 extending from both sides of the endwall 258. In such an embodiment, each sidewall 260 may be configured to receive or be received within a portion of the ends of the adjacent body portions 202A, 202B being coupled together at the body coupling 204.

Figure 9:
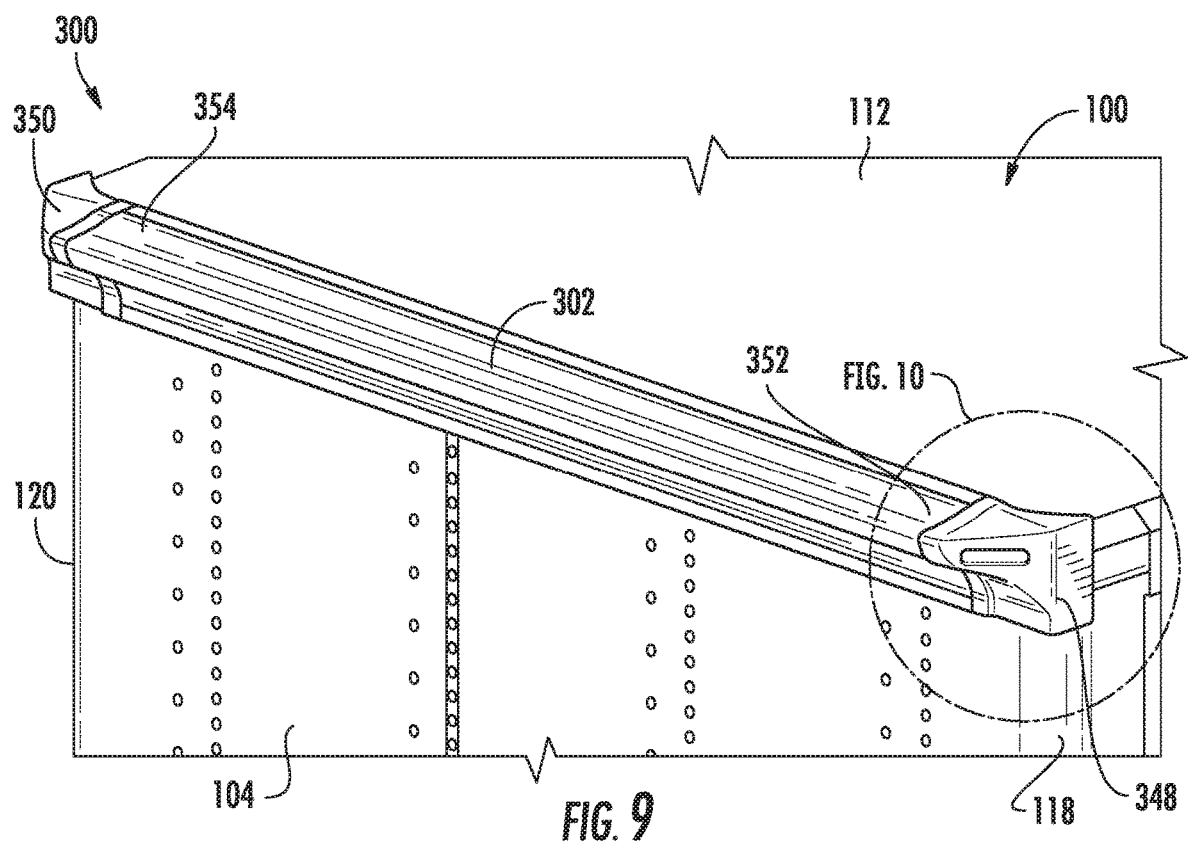
FIG. 9 illustrates a perspective view of another embodiment of a nose fairing configured in accordance with aspects of the present subject matter, particularly illustrating the nose fairing installed at or adjacent to the top edge of the front wall of the cargo enclosure shown in FIGS. 1-3.
Figure 10:
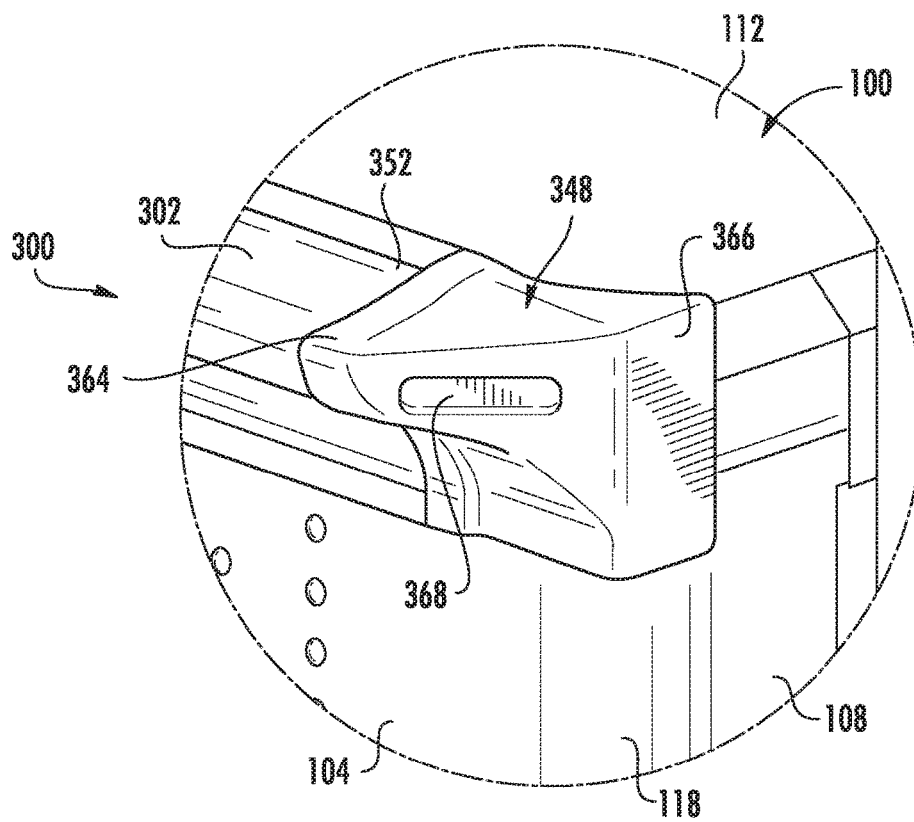
FIG. 10 illustrates a close-up, perspective view of a portion of the nose fairing shown in FIG. 9, particularly illustrating one embodiment of an end cap suitable for use with the nose fairing.

Referring now to FIGS. 9 and 10, another embodiment of a nose fairing 300 configured to be installed at the front end of a cargo enclosure 100 is illustrated in accordance with aspects of the present subject matter. Specifically, FIG. 9 illustrates a perspective view of the nose fairing 300 installed at the nose or to edge 116 of the cargo enclosure 100. Additionally, FIG. 10 illustrates a close-up, perspective of a portion of the nose fairing 300 shown in FIG. 9, particularly illustrating the portion of the nose fairing 300 positioned at one of the front corners of the cargo enclosure 100.

In general, the nose fairing 300 may be configured the same as or similar to the nose fairing 200 described above with reference to FIGS. 4-7. For example, the nose fairing 300 may include a nose body 302 generally defining the primary aerodynamic shape or profile of the nose fairing 300. Specifically, in several embodiments, the nose body 302 may define the same aerodynamic profile as that shown in FIG. 7, such as by including an upper nose wall 206 having convex region 212 transitioning to a concave region 214 as the nose body 302 extends away from the front wall 104 of the cargo enclosure 100, a lower nose wall 208 including a convex region 222 and a leading edge region 210 extending between the convex region 222 of the lower nose wall 208 and the concave region 214 of the upper nose wall 206. However, as shown in FIG. 9, as opposed to corresponding to a multi-piece component, the nose body 302 is simply configured as a unitary or continuous component extending across all or substantial portion of the width 124 of the cargo enclosure 100.

Additionally, similar to the embodiment described above, the nose fairing 300 includes end caps 348, 350 positioned at the opposed ends 352, 354 of the nose body 302. For example, the nose fairing 300 includes a first end cap 348 positioned at a first end 352 of the nose body 302 and a second end cap 350 positioned at a second end 354 of the nose body 302. However, unlike the end caps 248, 250 described above that terminate in a planar endwall 258, the end caps 348, 350 shown in FIGS. 9 and 10 are configured to extend outwardly form the ends 353, 354 of the nose body 302 and at least partially wrap around and/or conform to the shape of the corner defined between the front wall 104, the roof 112 and the adjacent sidewall 108, 110 of the cargo enclosure 100. Specifically, in several embodiments, the end caps 348, 350 may be configured to transition from the aerodynamic shape of the nose body 302 at one end to the shape of the cargo enclosure 100 defined at or adjacent to the corner at the other end. For example, as shown in FIG. 10, the end cap 348 may include a first end portion 364 positioned adjacent to the nose body 302 that defines a shape or profile that matches or is complimentary to the aerodynamic shape or profile of the nose body 302, such as by configuring the first end portion 364 similar to the sidewall 260 of the end cap 248, 250 described above with reference to FIG. 9. Additionally, each end cap 348, 350 may include a second end portion 366 opposite the first end portion 364 that conforms to the shape of the corner of the cargo enclosure 100. For instance, as shown in FIG. 10, the second end portion 366 of the end cap 348 may be configured to wrap around the corner of the cargo enclosure 100 such that the end cap 348 overlaps a portion(s) of the adjacent sidewall 108 and/or roof 112.

It should be appreciated that, in several embodiments, the end caps described herein may include any suitable features and/or may otherwise be configured to accommodate lights and/or any other suitable components typically installed onto at the front end or nose of a cargo enclosure 100. For example, as shown in FIG. 10, each end cap 348, 350 may, in one embodiment, define an opening or recessed surface 368 configured to receive a light or any other suitable device.

Figure 11:
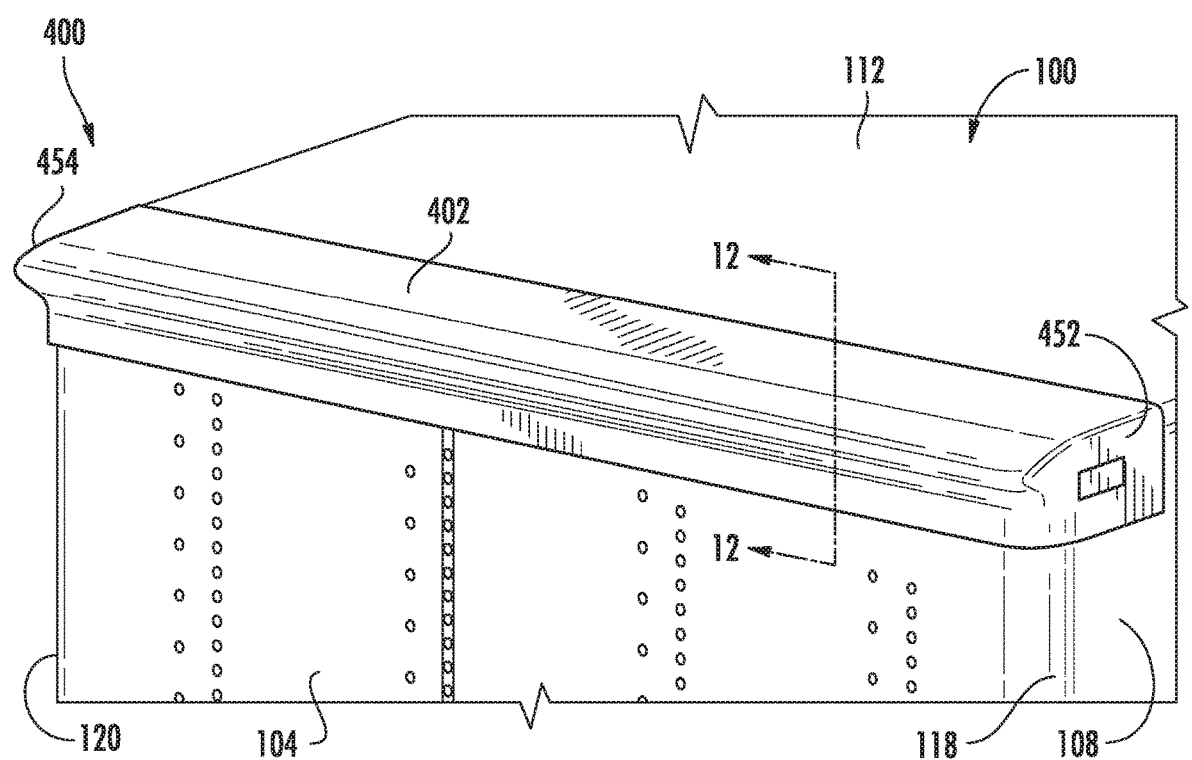
FIG. 11 a perspective view of a further embodiment of a nose fairing configured in accordance with aspects of the present subject matter, particularly illustrating the nose fairing installed at or adjacent to the top edge of the front wall of the cargo enclosure shown in FIGS. 1-3.
Figure 12:
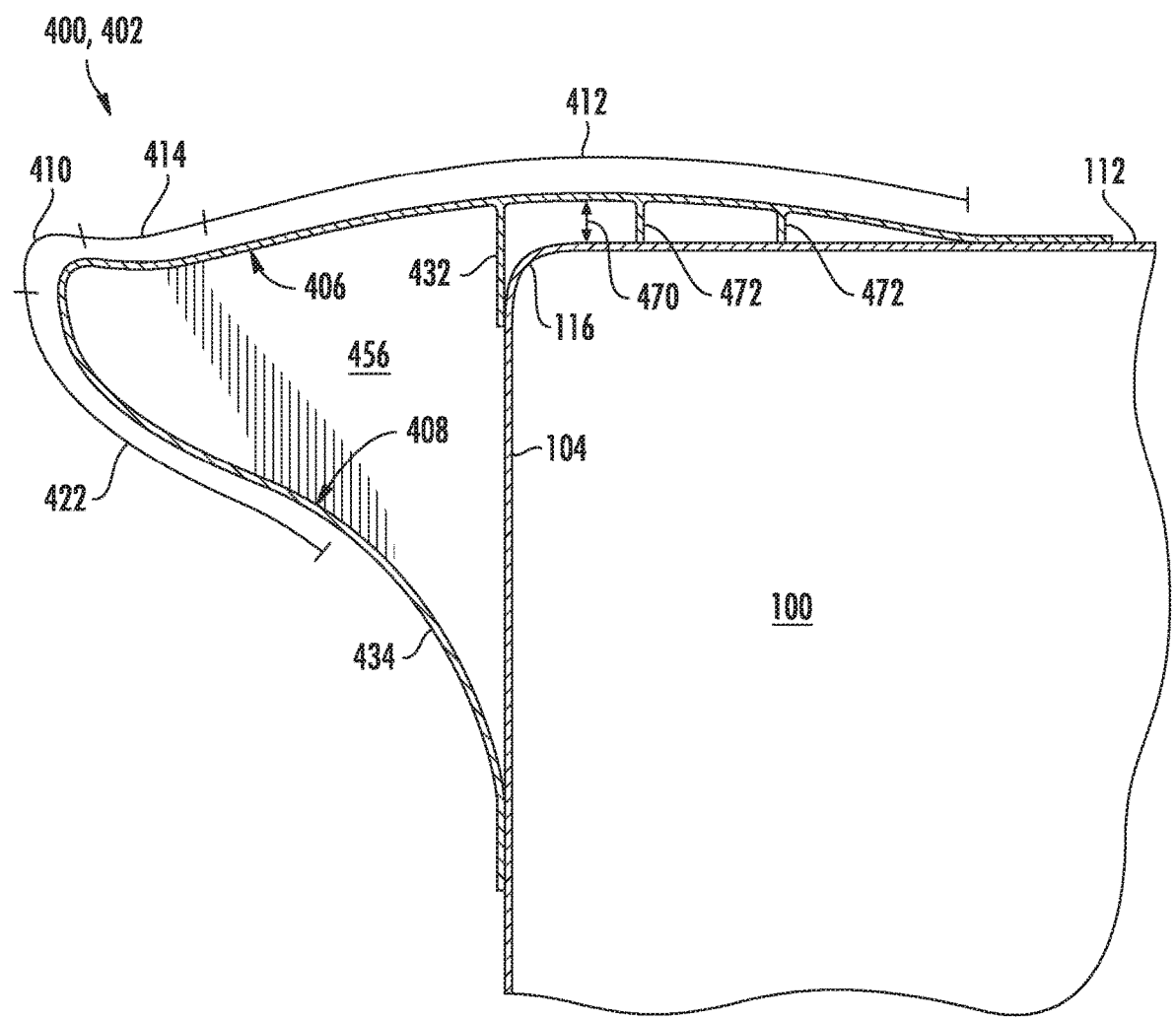
FIG. 12 illustrates a cross-sectional view of the nose fairing shown in FIG. 11 taken about line 12-12.

Referring now to FIGS. 11 and 12, a further embodiment of a nose fairing 400 configured to be installed at the front end of a cargo enclosure 100 is illustrated in accordance with aspects of the present subject matter. Specifically, FIG. 11 illustrates a perspective view of the nose fairing 400 installed at the nose or top edge 116 of the cargo enclosure 100. Additionally, FIG. 12 illustrates a cross-sectional view of the nose fairing 400 shown in FIG. 11 taken about line 12-12.

In general, the nose fairing 400 may be configured similar to the nose fairings 200, 300 described above with reference to FIGS. 4-10. For example, the nose fairing 400 may include a nose body 402 generally defining the primary aerodynamic shape or profile of the fairing 400. Specifically, in several embodiments, the nose body 402 may define a similar aerodynamic profile as that shown in FIG. 7. For instance, as shown in FIG. 12, the nose fairing 402 may include an upper nose wall 406 having a convex region 412 transitioning to a concave region 414 as the nose body 402 extends away from the front wall 104 of the cargo enclosure 100, a lower nose wall 408 including a convex region 422 and a leading edge region 410 extending between the convex region 422 of the lower nose wall 408 and the concave region 414 of the upper nose wall 406. However, as opposed to the upper nose wall 206 shown in FIG. 7 that transitions from the convex region 212 to the overlapped region 230 at or adjacent to the nose or top edge 116 of the cargo enclosure 100, the convex region 412 of the upper nose wall 406 shown in FIG. 12 continues aft of the front edge 116 so as to form all or portion of the overlapped region of the nose fairing 400.

Additionally, as shown in FIG. 12, the convex region 412 of the upper nose wall 406 may also be configured to extend out of profile relative to the roof 112 of the cargo enclosure 100. Specifically, in several embodiments, the convex region 412 may be initially sloped upwardly as its extends from the concave region 414 of the upper nose wall 406 in the direction of the cargo enclosure 100 such that the upper nose wall 406 extends out of profile relative to the roof 112 by a given offset distance 470. The convex region 412 of the upper nose wall 406 may then be sloped downwardly such that the offset distance 470 is reduced as the upper nose wall 406 extends closer to and contacts the roof 412. It should be appreciated that the convexly curved surface defined by the portion of the upper nose wall 406 overlapping the roof 112 may prevent or limit separation of the airflow as its transitions from the nose fairing 400 to the cargo enclosure 100, thereby reducing the overall amount of drag on the enclosure 100.

It should be appreciated that the offset distance defined between the upper nose wall 406 and the roof 112 of the cargo enclosure 100 may generally correspond to any suitable distance. However, in several embodiments, the offset distance may generally range from greater than zero to about 6 inches, such as from about 0.5 inches to about 4 inches or from about 1 inch to about 2 inches and/or any other subranges therebetween. Additionally, it should be appreciated that the offset distance may vary depending on the configuration of the cargo enclosure 100, the size of the air gap 150 defined adjacent to the fairing 400 and/or the characteristics of the airflow flowing over and/or past the fairing 400. For instance, in an embodiment in which the cargo enclosure 200 corresponds to a class 8, height contained trailer, the offset distance may range from greater than zero to about 2 inches, such as from about 0.5 inches to about 1.5 inches or from about 0.75 inches to about 1.25 inches and/or any other subranges therebetween.

Moreover, in several embodiments, the nose fairing 400 may also include one or more structural members configured to provide increased strength and/or rigidity to the fairing 400. For example, as shown in FIG. 12, the nose fairing 400 may include one or more stiffening ribs 472 extending between the convex region 412 of the upper nose wall 406 and the roof 112 along the portion of the upper nose wall 406 overlapping the roof 112. Such stiffening ribs 472 may allow the nose fairing 400 to maintain its out of profile shape relative to the roof 112 as air is flowing over the fairing 400. Additionally, although not shown, the nose fairing 400 may also include one or more additional structural components positioned at any other suitable location within the fairing 400. For example, in one embodiment, the nose fairing 400 may include one or more additional stiffening ribs extending between the upper and lower nose walls 406, 408 within the interior cavity 456 of the fairing 400.

Additionally, similar to the embodiments described above, the nose fairing 400 may also include additional features for locating the nose body 402 relative to the cargo enclosure 100 and/or for coupling the nose body 402 to the cargo enclosure 100. For example, as shown in FIG. 12, the nose fairing 400 may include a nose lip 432 configured to extend outwardly from the upper nose wall 406 along the front wall 104 of the cargo enclosure 100 so as to provide a mechanical stop for the nose body 402 when installing the nose fairing 400 onto the cargo enclosure 100. Further, as shown in FIG. 12, the lower nose wall 408 may, in several embodiments, include a lower mounting region 434 extending along the front wall 104 of the cargo enclosure 100 in a direction away from the roof 112 so as to provide a means for coupling the nose fairing 400 to the front wall 104.

Moreover, as shown in FIG. 11, as opposed to having separate end caps configured to transition to the shape of the corners of the cargo enclosure 100 (e.g., similar to the end caps 348, 350 shown in FIGS. 9 and 10), the end caps may, instead, be integrated into the nose body 402. In such an embodiment, the nose body 402 may correspond to a unitary or continuous component extending along the top edge 116 of the cargo enclosure 100 that transitions at its ends 452, 454 from the aerodynamic profile or shape shown in FIG. 12 to a shape that generally conforms to the shape of the front corners of the cargo enclosure 100. For instance, as shown in FIG. 11, the ends 452, 454 of the nose body 402 may be configured to wrap around each corner of the cargo enclosure 100 such that the nose body 402 overlaps a portion(s) of the adjacent sidewalls 108, 110 of the enclosure 100.

Figure 13:
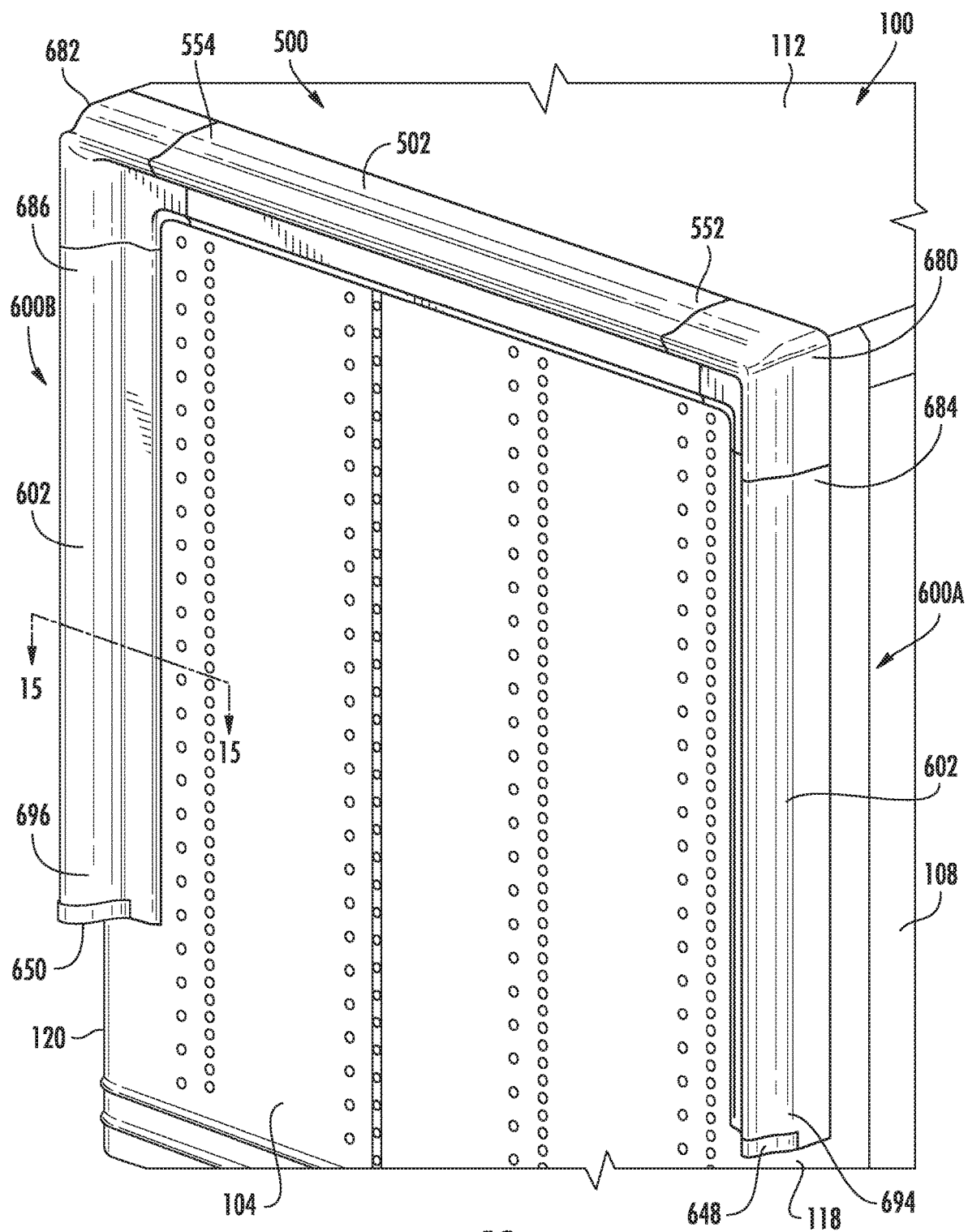
FIG. 13 illustrates another perspective view of the front wall of the cargo enclosure shown in FIGS. 1 and 3, particularly illustrating embodiments of a nose fairing and side fairing installed along the edges of the front wall.
Figure 14:
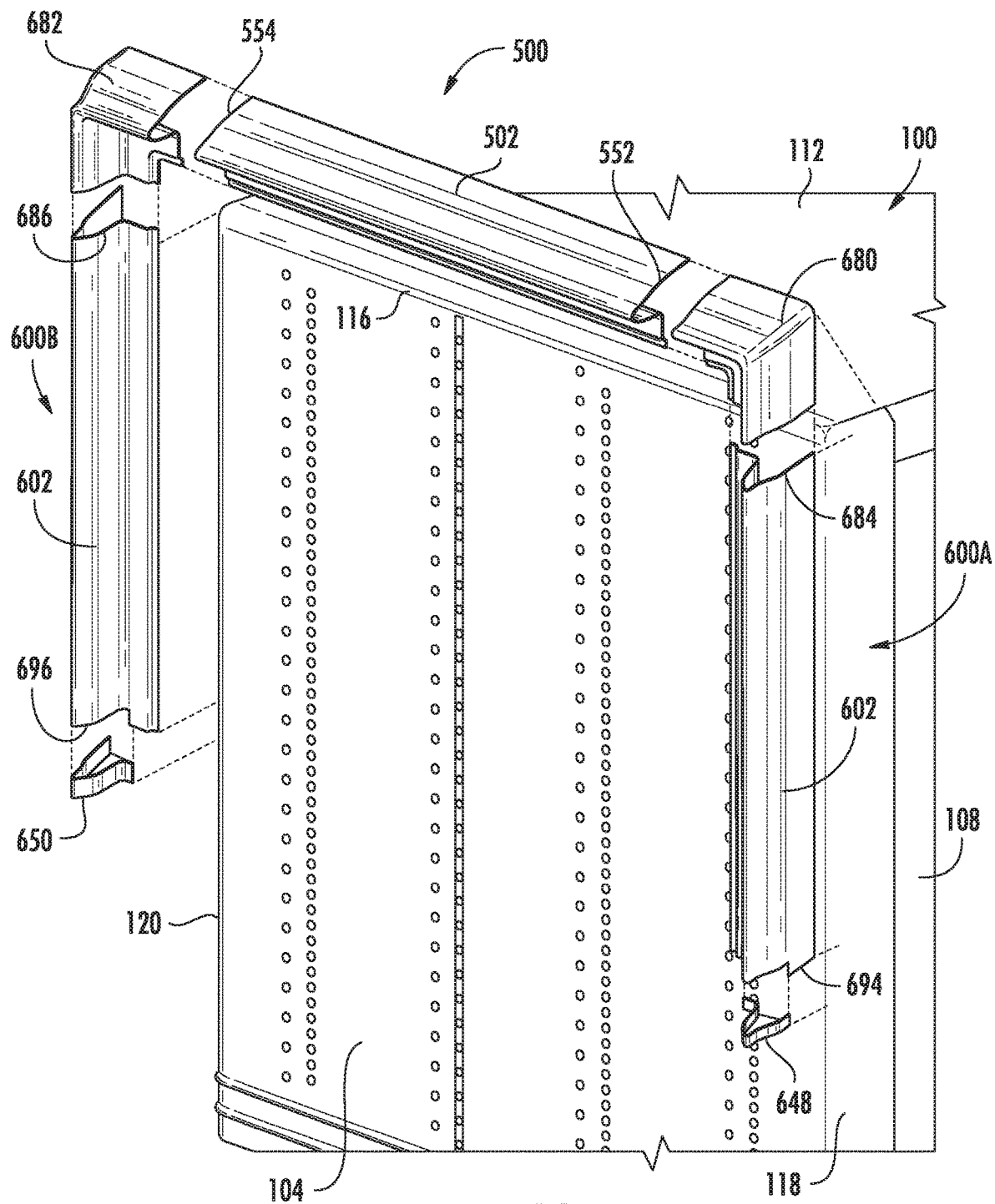
FIG. 14 illustrates an exploded view of the fairings shown in FIG. 13.
Figure 15:
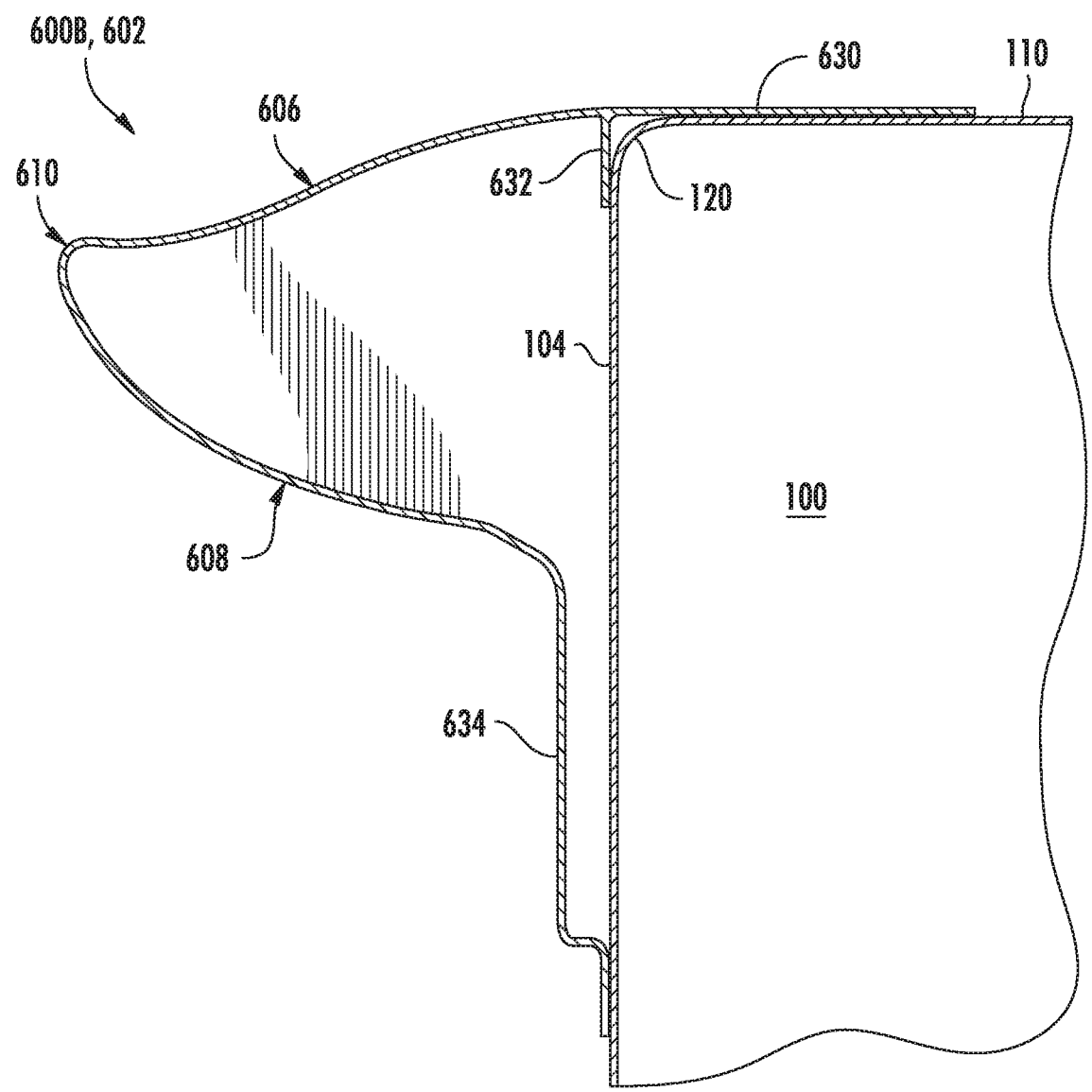
FIG. 15 illustrates a cross-sectional view of one of the side fairings shown in FIG. 13 taken about line 15-15.
Figure 16:
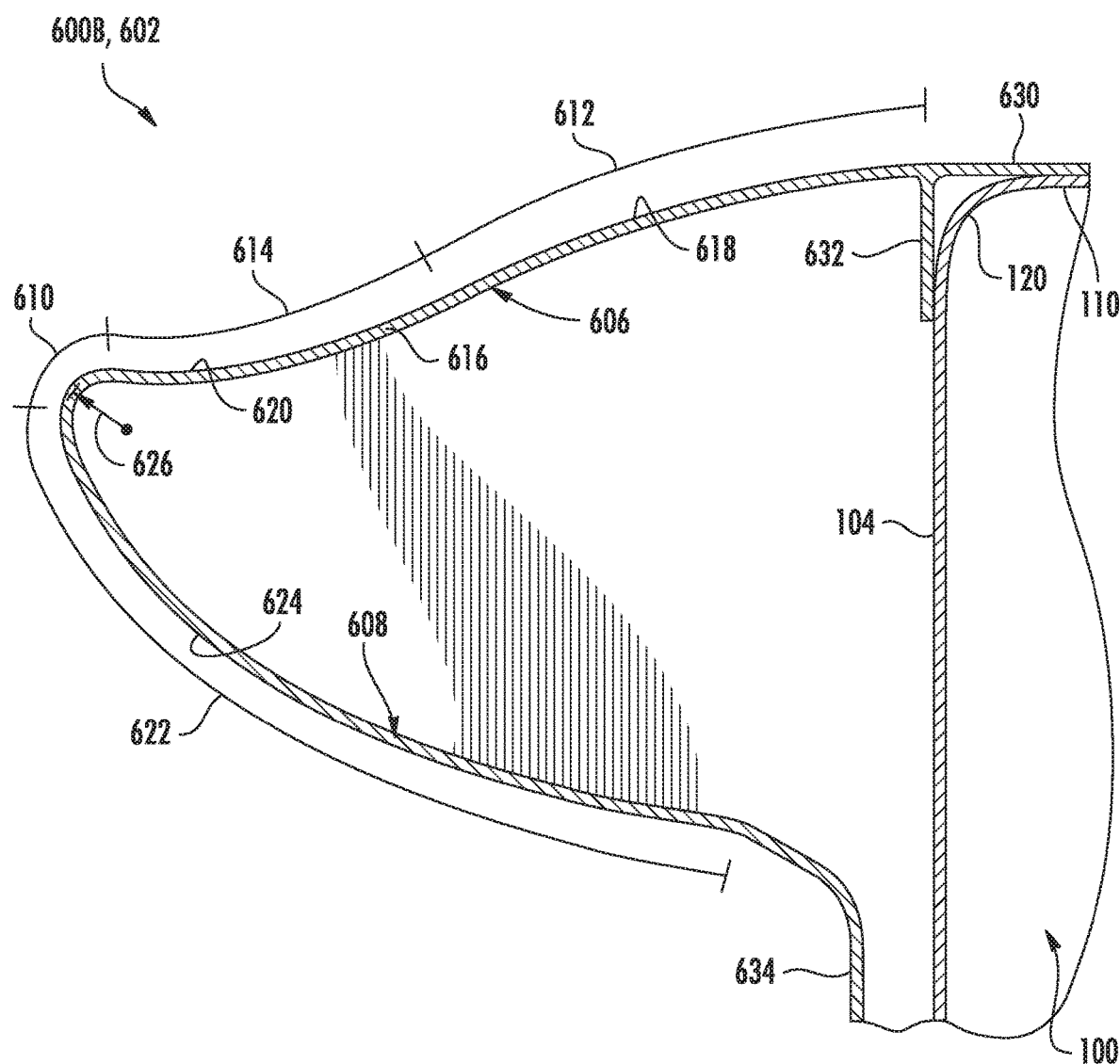
FIG. 16 illustrates a close-up view of a portion of the side fairing shown in FIG. 15.
Figure 17:
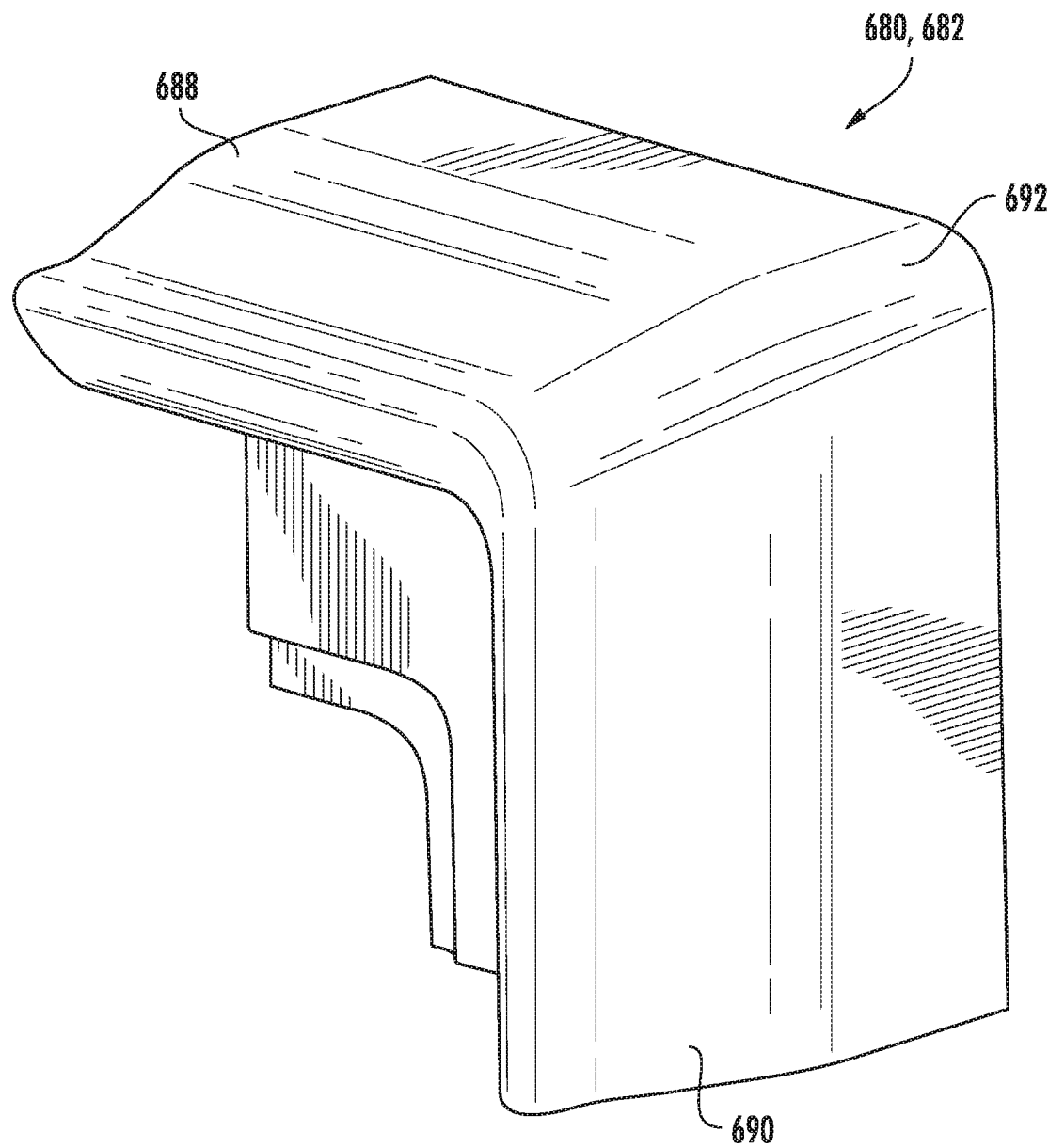
FIG. 17 illustrates a perspective view of one embodiment of a transition piece that may be installed between the nose fairing and each side fairing at the corners of the cargo enclosure.

Referring now to FIGS. 13-17, yet another embodiment of suitable fairings 500, 600A. 600B that may be installed at the front end of a cargo enclosure 100 is illustrated in accordance with aspects of the present subject matter. Specifically, FIG. 13 illustrates a perspective view of the cargo enclosure 100 including a nose fairing 500 installed at the top edge 116 of the enclosure 100 and first and second side fairings 600A, 600B installed at the side edges 118, 120 defined between the front wall 104 and the opposed sidewalls 108, 110 of the enclosure 100. FIG. 14 illustrates an exploded, perspective view of the various components shown in FIG. 13. FIG. 15 illustrates a cross-sectional view of one of the side fairings 600B shown in FIG. 13 taken about line 15-15 and FIG. 16 illustrates a close-up view of a portion of the side fairing 600B shown in FIG. 15. Additionally, FIG. 17 illustrates a close-up, perspective view of one embodiment of a transition piece 680, 682 that may be coupled between each end of the nose fairing 500 and the adjacent ends of the side fairings 600A, 600B.

As shown in FIGS. 13 and 14, the cargo enclosure 100 may include a nose fairing 500 installed at along its nose or top edge 116. In general, the nose fairing 500 may be configured the same as or similar to the nose fairings 200, 300, 400 described above with reference to FIGS. 4-12. For example, the nose fairing 500 may include a nose body 502 generally defining the primary aerodynamic shape or profile of the nose fairing 500. Specifically, in several embodiments, the nose body 502 may define the same aerodynamic profile as that shown in FIG. 7 or FIG. 12, such as by including an upper nose wall 206, 406 having a convex region 212, 412 transitioning to a concave region 214, 414 as the nose body 502 extends away from the front wall 104 of the cargo enclosure 100, a lower nose wall 208, 408 including a convex region 222, 422 and a leading edge region 210, 410 extending between the convex region 222, 422 of the lower nose wall 208, 408 and the concave region 214, 414 of the upper nose wall 206, 406.

Additionally, as shown in the illustrated embodiment, the cargo enclosure includes first and second side fairings 600A, 600B installed at the opposed side edges 118, 120 defined between the front wall 104 and the sidewalls 108, 110 of the cargo enclosure 100. Specifically, as shown in FIGS. 13 and 14, the cargo enclosure 100 includes a first side fairing 600A installed at the first side edge 118 defined between the front wall 104 and the first sidewall 108 and a second side fairing 600B installed at the second side edge 120 defined between the front wall 104 and the second sidewall 110, with each side fairing 600A, 600B being configured to extend lengthwise along the side edges 118, 120 across any suitable portion of the height 122 of the cargo enclosure 100.

In general, each side fairing 600A, 600B may include a unitary or multi-piece side body 602 configured to be installed along the front wall 104 at or adjacent to each corresponding side edge 118, 120 of the cargo enclosure 100. As shown in the illustrated embodiment, each side body 602 corresponds to a unitary or continuous component configured to span lengthwise across any suitable portion of the height 122 of the cargo enclosure 100. Alternatively, similar to the nose body 202 shown in FIGS. 4 and 5, each side body 602 may correspond to a two-piece (or more) assembly including separate body portions configured to be coupled together such that the assembled side body 602 extends lengthwise along its corresponding side edge 118, 120 across all or a portion of the height 122 of the cargo enclosure 100. In such an embodiment, each side fairing 600A, 600B may also include a body coupling(s) configured to be installed between the adjacent body portions of each side body 602 so at to couple the body portions 602 to one another.

Similar to the various nose bodies described herein, each side body 602 may generally be configured to define the primary aerodynamic shape or profile of its corresponding side fairing 600A, 600B. Specifically, in several embodiments, each side body 602 may define an aerodynamic shape or profile that generally corresponds to the aerodynamic shape or profile of the disclosed nose fairings 200, 300, 400, 500. For example, as shown in FIG. 15, each side body 602 may include an outer wall 606 defining an outer aerodynamic surface of the side body 602 and an inner wall 608 defining an inner aerodynamic surface of the side body 602. In addition, the side body 602 may include a leading edge region 610 extending between the outer and inner walls 606, 608 that generally defines the leading or forward edge of the side body 602.

In several embodiments, the outer wall 606 of each side body 602 may configured the same as or similar to the upper nose wall 206 of the nose body 202 described above with reference to FIG. 7. For example, as shown in FIG. 16, the outer wall 606 may generally be configured to extend outwardly from the front wall 104 of the cargo enclosure 100 from a location at or adjacent to the side edge 120 of the enclosure 100 to the leading edge region 610 so as to define the outer aerodynamic surface of the side body 602. Additionally, the portion of the outer wall 606 extending outwardly from the front wall 104 may include a convex region 612 and a concave region 614, with the outer wall 606 transitioning from the convex region 612 to the concave region 614 at a transition point 616 as the outer wall 606 extends outwardly from the front wall 104 of the cargo enclosure 100. As shown in FIG. 16, the convex region 612 may generally define a convexly curved surface 618 of the outer aerodynamic surface while the concave region 614 may generally define a concavely curved surface 620 of the outer aerodynamic surface. Moreover, as shown in FIG. 16, the concave region 614 of the outer wall 606 may terminate at the leading edge region 610 such that the outer wall 606 transitions directly from the concave region 614 to the leading edge region 610 as the side body 602 extends outwardly from the front wall 104 of the cargo enclosure 100.

Additionally, in several embodiments, the inner wall 608 of each side body 602 may be configured the same as or similar to the lower nose wall 208 of the nose body 202 described above with reference to FIG. 7. For example, as shown in FIG. 16, the inner wall 608 may generally be configured to extend between the front wall 104 of the cargo enclosure 100 and the leading edge region 610 of the side body 602 so as to define the inner aerodynamic surface of the side body 602. In addition, the inner wall 608 may include a convex region 622 extending outwardly from the front wall 104 in the direction of the leading edge region 610. Specifically, the convex region 622 may be configured to terminate at the leading edge region 610 such that the inner wall 608 transitions directly from the convex region 622 to the leading edge region 610 as the side body 602 extends outwardly from the front wall 104. As shown in FIG. 16, the convex region 622 may generally define a convexly curved surface 624 of the inner aerodynamic surface of the side body 602.

Moreover, in several embodiments, the leading edge region 610 of each side body 602 may be configured the same as or similar to the leading edge region 210 of the nose body 202 described above with reference to FIG. 7. For example, as shown in FIG. 16, the leading edge region 610 may generally correspond to a forward portion of the side body 602 that defines a radius of curvature 626 that differs from the radius of curvature defined by the inner and/or outer aerodynamic surfaces, such as by defining a radius of curvature 626 that differs from the radius of curvature of the convex region 622 of the inner wall 608 and/or from the radius of curvature of the concave region 614 and/or the convex region 612 of the outer wall 606. For example, in several embodiments, the leading edge region 610 may define a constant radius of curvature 626 between the convex region 622 of the inner wall 608 and the concave region 614 of the outer wall 606. In such embodiments, the side body 602 may transition from the uniformly radiused leading edge region 610 to the aerodynamically shaped inner and outer walls 608, 606.

It should be appreciated that, in other embodiments, each side body 602 may be configured the same as or similar to the nose body 402 described above with reference to FIG. 12. For example, the convex region 612 of the outer wall 606 may be configured to extend out of profile relative to the adjacent sidewall 118, 120 such that the outer wall 606 overlaps and is spaced apart from such sidewall 118, 120.

It should also be appreciated that, similar to the nose fairings 200, 300, 400, 500 described above, the configuration and/or size of each side body 602 may be varied, as necessary, to accommodate differing airflow conditions experienced along the side edges 118, 120 of the cargo enclosure 100. For example, the dimensions of each side body 602 may be varied to accommodate differing sized air gaps 150 defined between the cargo enclosure 100 and an adjacent upstream component (e.g., the cab 126 of the tractor 102).

Additionally, it should be appreciated that each side fairing 600A, 600B may also include any of the additional features described above with reference to any of the embodiments of the nose fairings 200, 300, 400, 500. For example, as shown in FIG. 15, each side fairing 600A, 600B may include an overlapped region 630 extending aft of the adjacent side edge 118, 120 of the cargo enclosure 100 such that the overlapped region 630 overlaps at least a portion of the corresponding sidewall 108, 110. Additionally, as shown in FIG. 16, each side fairing may include a side lip 632 extending inwardly from the outer wall 606 so as to engage the front wall 104 of the cargo enclosure 100 when the side fairing 600A, 600B is installed thereon. Moreover, as shown in FIG. 15, each side fairing 600A, 600B may further include an inner mounting region 634 extending along the front wall 104 of the cargo enclosure 100 in a direction away from the adjacent side wall 108, 110 so as to provide a means for coupling the side fairing 600A, 600B to the front wall 104.

Referring still to FIGS. 13-17, in embodiments in which the cargo enclosure 100 includes both a nose fairing 500 and one or more side fairings 600A, 600B installed thereon, the cargo enclosure 100 may also include a transition piece 680, 682 positioned between each end of the nose fairing 500 and the adjacent upper ends of the side fairings 600A, 600B. Specifically, as shown in FIGS. 13 and 14, a first transition piece 680 may configured to extend between a first end 552 of the nose fairing 500 and an upper end 684 of the first side fairing 600A. Additionally, a second transition piece 682 may be configured to extend between a second end 554 of the nose fairing 500 and an upper end 686 of the second side fairing 600B.

In general, each transition piece 608, 682 may be configured to transition between the horizontally oriented, aerodynamic profile of the nose fairing 500 to the vertically oriented, aerodynamic profile of the corresponding side fairing 600A, 600B. For example, as particularly shown in FIG. 17, each transition piece 682, 684 may include a first end section 688 defining a horizontally oriented aerodynamic shape or profile that matches or is complementary to the aerodynamic profile of the nose fairing 500 and a second end section 690 defining a vertically oriented aerodynamic shape or profile that matches or is complementary to the aerodynamic profile of the corresponding side fairing 600A, 600B. In addition, each transition piece 680, 682 may include a middle section 692 that provides a transition area between the horizontally and vertically oriented shapes at or adjacent to the corner of the cargo enclosure 100. As such, a substantially continuous aerodynamic profile may be formed along the top edge 116 and side edges 118, 120 of the cargo enclosure 100 as the nose fairing 500 transitions to the side fairings 600A, 600B along the outer perimeter of the front wall 104.

Additionally, as shown in FIGS. 13 and 14, an end cap 648, 650 may be configured to be installed at the lower end 694, 696 of each side fairing 600A, 600B. In general, each end cap 648, 650 may be configured the same as or similar to any of the end caps described above, such as by being configured the same as or similar to the end cap 248, 250 shown in FIG. 8. For example, each end cap 648, 650 may define a shape or profile that generally corresponds to the aerodynamic shape or profile of the side faring 600A, 600B such that the lower end 694, 696 of each fairing 600A, 600B may be received within or receive a portion of the corresponding end cap 648, 650.

It should be appreciated that, although the side fairings 600A, 600B are shown as being installed on the cargo enclosure 100 in combination with the nose fairing 500, the side fairings 600A. 600B may, instead, be installed as stand-alone components. For example, in one embodiment, the cargo enclosure 100 may only include the side fairings 600A, 600B installed along its front side edges 118, 120.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cargo enclosure for storing cargo, the cargo enclosure including a front wall, a rear wall and a roof extending between the front and rear walls, the cargo enclosure defining a top edge at the interface between the front wall and the roof, the cargo enclosure further comprising:
   a nose fairing including a nose body extending in a lengthwise direction along the front wall between a first end and a second end of the nose body, the nose body including an upper nose wall, a lower nose wall and a leading edge region extending between the upper and lower nose walls, the upper nose wall extending away from the front wall at a location at or adjacent to the top edge of the cargo enclosure, the upper nose wall including a concave region defining a concavely curved surface and the lower nose wall including a convex region defining a convexly curved surface; and
   a firsts end cap installed adjacent to the first end of the nose body such that the first end cap projects outwardly from the first end of the nose body in the lengthwise direction;
   wherein the first end cap is configured to mate with the first end of the nose body and close off an inner cavity that is defined between the nose body and the front wall of the cargo enclosure; and
   wherein the first end cap is configured to accommodate a lighting device at a location spaced apart from the first end of the nose body in the lengthwise direction.

2. The cargo enclosure of claim 1, wherein at least a portion of the first end cap defines a curved profile substantially corresponding to a profile of the nose body.

3. The cargo enclosure of claim 2, wherein the curved profile of the first end cap includes a concave portion substantially corresponding to the concave region of the upper nose wall and a convex portion substantially corresponding to the convex region of the lower nose wall.

4. The cargo enclosure of claim 2, wherein the first end cap transitions from the curved profile to a shape corresponding to a shape of a front corner of the cargo enclosure.

5. The cargo enclosure of claim 4, wherein the first end cap is configured to accommodate the lighting device at a location adjacent to the front corner of the cargo enclosure.

6. The cargo enclosure of claim 4, wherein the first end cap is configured to at least partially wrap around the front corner of the cargo enclosure.

7. The cargo enclosure of claim 1, wherein the first end cap defines a recessed surface spaced apart from the first end of the nose body that is configured to accommodate the lighting device.

8. The cargo enclosure of claim 1, further comprising a second end cap installed adjacent to the second end of the nose body such that the second end cap projects outwardly from the second end of the nose body in the lengthwise direction, the second end cap being configured to accommodate a second lighting device at a location spaced apart from the second end of the nose body in the lengthwise direction.

9. The cargo enclosure of 1, wherein the leading edge region defines a radius of curvature that differs from a radius of curvature of the convex region of the lower nose wall.

10. The cargo enclosure of 1, wherein upper nose wall further includes an upper convex region defining a convexly curved surface, the upper nose wall transitioning from the upper convex region to the concave region as the nose body extends outwardly from the front wall in the direction of the leading edge region.

11. A kit for retrofitting an existing cargo enclosure, the cargo enclosure including a front wall, a rear wall and a sidewall extending between the front and rear walls, the cargo enclosure defining a side edge at the interface between the sidewall and the front wall, the kit comprising:
- a nose fairing including a nose body configured to extend in a lengthwise direction along the front wall between a first end and a second end of the nose body at a location at or adjacent to the top edge of the cargo enclosure, the nose body including an upper nose wall, a lower nose wall and a leading edge region extending between the upper and lower nose walls, the upper nose wall including a concave region defining a concavely curved surface and the lower nose wall including a convex region defining a convexly curved surface; and
- a first end cap configured to be installed adjacent to the first end of the nose body such that the end cap projects outwardly from the first end of the nose body in the lengthwise direction;
- wherein the first end cap is configured to mate with the first end of the nose body and close off an inner cavity that is defined between the nose body and the front wall of the cargo enclosure.

12. The kit of claim 11, wherein at least a portion of the first end cap defines a curved profile substantially corresponding to a profile of the nose body.

13. The kit of claim 12, wherein the curved profile of the first end cap includes a concave portion substantially corresponding to the concave region of the upper nose wall and a convex portion substantially corresponding to the convex region of the lower nose wall.

14. The kit of claim 12, wherein the first end cap transitions from the curved profile to a shape corresponding to a shape of a front corner of the cargo enclosure.

15. The kit of claim 14, wherein the first end cap is configured to accommodate a lighting device at a location adjacent to the front corner of the cargo enclosure.

16. The kit of claim 14, wherein the first end cap is configured to at least partially wrap around the front corner of the cargo enclosure.

17. The kit of claim 11, wherein the first end cap is configured to accommodate a lighting device at a location spaced apart from the first end of the nose body in the lengthwise direction.

18. The kit of claim 17, wherein the first end cap defines a recessed surface spaced apart from the first end of the nose body that is configured to accommodate the lighting device.

19. The kit of claim 11, further comprising a second end cap configured to be installed adjacent to the second end of the nose body such that the second end cap projects outwardly from the second end of the nose body in the lengthwise direction.

20. The kit of claim 11, wherein the upper nose wall further includes an upper convex region defining a convexly curved surface, the upper nose wall transitioning from the upper convex region to the concave region as the nose body extends outwardly from the front wall in the direction of the leading edge region.

* * * * *